(12) United States Patent
Rao et al.

(10) Patent No.: US 11,785,501 B2
(45) Date of Patent: Oct. 10, 2023

(54) TECHNIQUES FOR TIMER ADJUSTMENT FOR PACKET LOSS

(71) Applicant: QUALCOMM Incorporated, San Diego, CA (US)

(72) Inventors: Vaishakh Rao, San Diego, CA (US); Leena Zacharias, San Jose, CA (US); Vishal Dalmiya, San Diego, CA (US); Arnaud Meylan, San Diego, CA (US); Sitaramanjaneyulu Kanamarlapudi, San Diego, CA (US); Touseef Khan, San Diego, CA (US); Manjinder Singh Sandhu, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/302,675

(22) Filed: May 10, 2021

(65) Prior Publication Data

US 2022/0053367 A1 Feb. 17, 2022

Related U.S. Application Data

(60) Provisional application No. 63/067,760, filed on Aug. 19, 2020, provisional application No. 62/706,341, filed on Aug. 11, 2020.

(51) Int. Cl.
*H04W 28/04* (2009.01)
*H04W 28/02* (2009.01)
(Continued)

(52) U.S. Cl.
CPC ............. *H04W 28/04* (2013.01); *H04L 47/32* (2013.01); *H04W 28/0278* (2013.01); *H04W 28/06* (2013.01); *H04W 80/02* (2013.01)

(58) Field of Classification Search
CPC . H04W 28/04; H04W 28/0278; H04W 28/06; H04W 80/02; H04W 28/0858;
(Continued)

(56) References Cited

U.S. PATENT DOCUMENTS

2016/0095033 A1   3/2016  Kadiri et al.
2018/0062709 A1*  3/2018  Vaze ..................... H04B 17/29
2018/0351873 A1* 12/2018  Chan ................. H04W 28/0278

FOREIGN PATENT DOCUMENTS

WO   2017023444 A1   2/2017
WO   2018191916 A1  10/2018

OTHER PUBLICATIONS

International Search Report and Written Opinion—PCT/US2021/070865—ISA/EPO—dated Nov. 8, 2021.
(Continued)

*Primary Examiner* — Mandish K Randhawa
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive information indicating a timer value of a timer associated with discarding a packet data convergence protocol (PDCP) service data unit (SDU). The UE may determine that a timer modification condition is satisfied. The UE may modify the timer value based at least in part on the determination that the timer modification condition is satisfied. The UE may transmit a communication using the modified timer value. Numerous other aspects are provided.

28 Claims, 19 Drawing Sheets

(51) Int. Cl.
*H04L 47/32* (2022.01)
*H04W 80/02* (2009.01)
*H04W 28/06* (2009.01)

(58) Field of Classification Search
CPC ......... H04W 28/0967; H04W 28/0236; H04W 72/1268; H04L 47/32; H04L 1/188; H04L 69/28; H04L 1/02
See application file for complete search history.

(56) References Cited

OTHER PUBLICATIONS

Samsung: "PDCP Discard Timer Operation for NR", 3GPP TSG-RAN WG2 Meeting #97bis, 3GPP Draft, R2-1703581 PDCP Discard Timer Operation for NR, 3rd Generation Partnership Project (3GPP), Mobile Competence Centre, 650, Route Des Lucioles, F-06921 Sophia-Antipolis Cedex, France, vol. RAN WG2, No. Spokane, USA, Apr. 3, 2017-Apr. 7, 2017, Apr. 3, 2017 (Apr. 3, 2017), 2 Pages, XP051245420, Retrieved from the Internet: URL: http://www.3gpp.org/ftp/Meetings_3GPP_SYNC/RAN2/Docs/, [retrieved on Apr. 3, 2017], p. 1, line 8-p. 2, line 13.

\* cited by examiner

TECHNIQUES FOR TIMER ADJUSTMENT FOR PACKET LOSS

CROSS-REFERENCE TO RELATED APPLICATION

This Patent Application claims priority to U.S. Provisional Patent Application No. 62/706,341, filed on Aug. 11, 2020, entitled "TECHNIQUES FOR TIMER ADJUSTMENT FOR PACKET LOSS," and to U.S. Provisional Patent Application No. 63/067,760, filed on Aug. 19, 2020, entitled "TECHNIQUES FOR DYNAMIC PDCP TIMER ADJUSTMENT," both assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for timer adjustment for packet loss.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving information indicating a timer value of a timer associated with discarding a packet data convergence protocol (PDCP) service data unit (SDU); determining that a timer modification condition is satisfied; modifying the timer value based at least in part on the determination that the timer modification condition is satisfied; and transmitting a communication using the modified timer value.

In some aspects, the timer modification condition is associated with an uplink grant limited scenario.

In some aspects, the uplink grant limited scenario is based at least in part on the UE modifying a buffer status report of the UE due to a thermal mitigation condition being satisfied.

In some aspects, the timer modification condition is based at least in part on the thermal mitigation condition, and the timer modification condition indicates to increase the timer value based at least in part on the thermal mitigation condition being satisfied.

In some aspects, the timer is disabled based at least in part on the buffer status report being modified to indicate no data in a buffer of the UE.

In some aspects, the uplink grant limited scenario is based at least in part on a gap associated with a dual subscriber identity module dual standby configuration.

In some aspects, the timer is disabled based at least in part on a length of the gap being indeterminate at a time of initiation of the gap.

In some aspects, the timer modification condition is based at least in part on a length of the gap satisfying a threshold.

In some aspects, the timer value is increased by a value equal to the length of the gap.

In some aspects, the timer is disabled based at least in part on the length of the gap satisfying the threshold.

In some aspects, the uplink grant limited scenario is based at least in part on a block error rate (BLER) of the UE.

In some aspects, the timer value is increased based at least in part on the BLER satisfying a threshold.

In some aspects, the method includes determining the modified timer value based at least in part on a plurality of thresholds for the BLER.

In some aspects, the timer is disabled based at least in part on the BLER satisfying a threshold.

In some aspects, the timer is disabled based at least in part on an uplink split bearer being configured for the UE, based at least in part on a primary radio link control entity of the uplink split bearer being associated with a BLER that satisfies a threshold, and based at least in part on a data split threshold of the uplink split bearer being set to infinity.

In some aspects, the timer is disabled based at least in part on an uplink split bearer being configured for the UE, based at least in part on a primary radio link control entity of the uplink split bearer being associated with a BLER that satisfies a threshold, and based at least in part on a buffer size of the UE being less than a data split threshold of the uplink split bearer.

In some aspects, the timer modification condition is associated with a bearer configured for compression of packets transmitted on the bearer.

In some aspects, the timer value is increased based at least in part on the bearer being configured for compression of packets transmitted on the bearer.

In some aspects, the timer value is disabled based at least in part on the bearer being configured for compression of packets transmitted on the bearer.

In some aspects, the bearer is configured for robust header compression.

In some aspects, the bearer is configured for uplink data compression.

In some aspects, a UE for wireless communication includes a memory and one or more processors operatively coupled to the memory, the memory and the one or more processors configured to: receive information indicating a timer value of a timer associated with discarding a PDCP SDU; determine that a timer modification condition is satisfied; modify the timer value based at least in part on the determination that the timer modification condition is satisfied; and transmit a communication using the modified timer value.

In some aspects, the timer modification condition is associated with an uplink grant limited scenario.

In some aspects, the uplink grant limited scenario is based at least in part on the UE modifying a buffer status report of the UE due to a thermal mitigation condition being satisfied.

In some aspects, the timer modification condition is based at least in part on the thermal mitigation condition, and the timer modification condition indicates to increase the timer value based at least in part on the thermal mitigation condition being satisfied.

In some aspects, the timer is disabled based at least in part on the buffer status report being modified to indicate no data in a buffer of the UE.

In some aspects, the uplink grant limited scenario is based at least in part on a gap associated with a dual subscriber identity module dual standby configuration.

In some aspects, the timer is disabled based at least in part on a length of the gap being indeterminate at a time of initiation of the gap.

In some aspects, the timer modification condition is based at least in part on a length of the gap satisfying a threshold.

In some aspects, the timer value is increased by a value equal to the length of the gap.

In some aspects, the timer is disabled based at least in part on the length of the gap satisfying the threshold.

In some aspects, the uplink grant limited scenario is based at least in part on a BLER of the UE.

In some aspects, the timer value is increased based at least in part on the BLER satisfying a threshold.

In some aspects, the one or more processors are further configured to determine the modified timer value based at least in part on a plurality of thresholds for the BLER.

In some aspects, the timer is disabled based at least in part on the BLER satisfying a threshold.

In some aspects, the timer is disabled based at least in part on an uplink split bearer being configured for the UE, based at least in part on a primary radio link control entity of the uplink split bearer being associated with a BLER that satisfies a threshold, and based at least in part on a data split threshold of the uplink split bearer being set to infinity.

In some aspects, the timer is disabled based at least in part on an uplink split bearer being configured for the UE, based at least in part on a primary radio link control entity of the uplink split bearer being associated with a BLER that satisfies a threshold, and based at least in part on a buffer size of the UE being less than a data split threshold of the uplink split bearer.

In some aspects, the timer modification condition is associated with a bearer configured for compression of packets transmitted on the bearer.

In some aspects, the timer value is increased based at least in part on the bearer being configured for compression of packets transmitted on the bearer.

In some aspects, the timer value is disabled based at least in part on the bearer being configured for compression of packets transmitted on the bearer.

In some aspects, the bearer is configured for robust header compression.

In some aspects, the bearer is configured for uplink data compression.

In some aspects, a non-transitory computer-readable medium storing a set of instructions for wireless communication includes one or more instructions that, when executed by one or more processors of a UE, cause the UE to: receive information indicating a timer value of a timer associated with discarding a PDCP SDU; determine that a timer modification condition is satisfied; modify the timer value based at least in part on the determination that the timer modification condition is satisfied; and transmit a communication using the modified timer value.

In some aspects, the timer modification condition is associated with an uplink grant limited scenario.

In some aspects, the uplink grant limited scenario is based at least in part on the UE modifying a buffer status report of the UE due to a thermal mitigation condition being satisfied.

In some aspects, the timer modification condition is based at least in part on the thermal mitigation condition, and the timer modification condition indicates to increase the timer value based at least in part on the thermal mitigation condition being satisfied.

In some aspects, the timer is disabled based at least in part on the buffer status report being modified to indicate no data in a buffer of the UE.

In some aspects, the uplink grant limited scenario is based at least in part on a gap associated with a dual subscriber identity module dual standby configuration.

In some aspects, the timer is disabled based at least in part on a length of the gap being indeterminate at a time of initiation of the gap.

In some aspects, the timer modification condition is based at least in part on a length of the gap satisfying a threshold.

In some aspects, the timer value is increased by a value equal to the length of the gap.

In some aspects, the timer is disabled based at least in part on the length of the gap satisfying the threshold.

In some aspects, the uplink grant limited scenario is based at least in part on a BLER of the UE.

In some aspects, the timer value is increased based at least in part on the BLER satisfying a threshold.

In some aspects, the one or more instructions further cause the UE to: determine the modified timer value based at least in part on a plurality of thresholds for the BLER.

In some aspects, the timer is disabled based at least in part on the BLER satisfying a threshold.

In some aspects, the timer is disabled based at least in part on an uplink split bearer being configured for the UE, based at least in part on a primary radio link control entity of the uplink split bearer being associated with a BLER that satisfies a threshold, and based at least in part on a data split threshold of the uplink split bearer being set to infinity.

In some aspects, the timer is disabled based at least in part on an uplink split bearer being configured for the UE, based at least in part on a primary radio link control entity of the uplink split bearer being associated with a BLER that satisfies a threshold, and based at least in part on a buffer size of the UE being less than a data split threshold of the uplink split bearer.

In some aspects, the timer modification condition is associated with a bearer configured for compression of packets transmitted on the bearer.

In some aspects, the timer value is increased based at least in part on the bearer being configured for compression of packets transmitted on the bearer.

In some aspects, the timer value is disabled based at least in part on the bearer being configured for compression of packets transmitted on the bearer.

In some aspects, the bearer is configured for robust header compression.

In some aspects, the bearer is configured for uplink data compression.

In some aspects, an apparatus for wireless communication includes: means for receiving information indicating a timer value of a timer associated with discarding a PDCP SDU; means for determining that a timer modification condition is satisfied; means for modifying the timer value based at least in part on the determination that the timer modification condition is satisfied; and means for transmitting a communication using the modified timer value.

In some aspects, the timer modification condition is associated with an uplink grant limited scenario.

In some aspects, the uplink grant limited scenario is based at least in part on the UE modifying a buffer status report of the UE due to a thermal mitigation condition being satisfied.

In some aspects, the timer modification condition is based at least in part on the thermal mitigation condition, and the timer modification condition indicates to increase the timer value based at least in part on the thermal mitigation condition being satisfied.

In some aspects, the timer is disabled based at least in part on the buffer status report being modified to indicate no data in a buffer of the UE.

In some aspects, the uplink grant limited scenario is based at least in part on a gap associated with a dual subscriber identity module dual standby configuration.

In some aspects, the timer is disabled based at least in part on a length of the gap being indeterminate at a time of initiation of the gap.

In some aspects, the timer modification condition is based at least in part on a length of the gap satisfying a threshold.

In some aspects, the timer value is increased by a value equal to the length of the gap.

In some aspects, the timer is disabled based at least in part on the length of the gap satisfying the threshold.

In some aspects, the uplink grant limited scenario is based at least in part on a BLER of the UE.

In some aspects, the timer value is increased based at least in part on the BLER satisfying a threshold.

In some aspects, the apparatus includes means for determining the modified timer value based at least in part on a plurality of thresholds for the BLER.

In some aspects, the timer is disabled based at least in part on the BLER satisfying a threshold.

In some aspects, the timer is disabled based at least in part on an uplink split bearer being configured for the UE, based at least in part on a primary radio link control entity of the uplink split bearer being associated with a BLER that satisfies a threshold, and based at least in part on a data split threshold of the uplink split bearer being set to infinity.

In some aspects, the timer is disabled based at least in part on an uplink split bearer being configured for the UE, based at least in part on a primary radio link control entity of the uplink split bearer being associated with a BLER that satisfies a threshold, and based at least in part on a buffer size of the UE being less than a data split threshold of the uplink split bearer.

In some aspects, the timer modification condition is associated with a bearer configured for compression of packets transmitted on the bearer.

In some aspects, the timer value is increased based at least in part on the bearer being configured for compression of packets transmitted on the bearer.

In some aspects, the timer value is disabled based at least in part on the bearer being configured for compression of packets transmitted on the bearer.

In some aspects, the bearer is configured for robust header compression.

In some aspects, the bearer is configured for uplink data compression.

A method of wireless communications at a UE is described. The method may include identifying data traffic that is to be transmitted according to an uplink grant, the data traffic associated with a first PDCP discard timer, determining a set of conditions associated with the uplink grant, the UE, or both, the set of conditions associated with a data rate of the uplink grant, determining a set of parameters associated with the data traffic based on the determined set of conditions, determining a second PDCP discard timer different from the first PDCP discard timer based on the determined set of parameters, and transmitting the data traffic according to the uplink grant using the second PDCP discard timer.

An apparatus for wireless communications at a UE is described. The apparatus may include a processor, memory coupled with the processor, and instructions stored in the memory. The instructions may be executable by the processor to cause the apparatus to identify data traffic that is to be transmitted according to an uplink grant, the data traffic associated with a first packet PDCP discard timer, determine a set of conditions associated with the uplink grant, the UE, or both, the set of conditions associated with a data rate of the uplink grant, determine a set of parameters associated with the data traffic based on the determined set of conditions, determine a second PDCP discard timer different from the first PDCP discard timer based on the determined set of parameters, and transmit the data traffic according to the uplink grant using the second PDCP discard timer.

Another apparatus for wireless communications at a UE is described. The apparatus may include means for identifying data traffic that is to be transmitted according to an uplink grant, the data traffic associated with a first PDCP discard timer, determining a set of conditions associated with the uplink grant, the UE, or both, the set of conditions associated with a data rate of the uplink grant, determining a set of parameters associated with the data traffic based on the determined set of conditions, determining a second PDCP discard timer different from the first PDCP discard timer based on the determined set of parameters, and transmitting the data traffic according to the uplink grant using the second PDCP discard timer.

A non-transitory computer-readable medium storing code for wireless communications at a UE is described. The code may include instructions executable by a processor to identify data traffic that is to be transmitted according to an uplink grant, the data traffic associated with a first PDCP discard timer, determine a set of conditions associated with the uplink grant, the UE, or both, the set of conditions associated with a data rate of the uplink grant, determine a set of parameters associated with the data traffic based on the determined set of conditions, determine a second PDCP discard timer different from the first PDCP discard timer based on the determined set of parameters, and transmit the data traffic according to the uplink grant using the second PDCP discard timer.

Some examples of the method, apparatuses, and non-transitory computer-readable medium described herein may further include operations, features, means, or instructions for selectively adjusting the first PDCP discard timer to generate the second PDCP discard timer, where determining the second PDCP discard timer may be based on selectively adjusting the first PDCP discard timer.

Some examples of the method, apparatuses, and non-transitory computer-readable medium described herein may further include operations, features, means, or instructions for determining an expiration of a validity period associated with the second PDCP discard timer, and transmitting the data traffic using the first PDCP discard timer based on the expiration of the validity period.

In some examples of the method, apparatuses, and non-transitory computer-readable medium described herein, determining the set of parameters associated with the data traffic may include operations, features, means, or instructions for determining one or more bearers associated with the data traffic, where the data traffic may be transmitted according to the uplink grant based on applying the second PDCP discard timer to the one or more bearers associated with the data traffic.

Some examples of the method, apparatuses, and non-transitory computer-readable medium described herein may further include operations, features, means, or instructions for receiving, from an application or program executed by the UE, an indication of the set of parameters associated with the data traffic, where determining the set of parameters associated with the data traffic may be based on receiving the indication.

In some examples of the method, apparatuses, and non-transitory computer-readable medium described herein, determining the set of parameters associated with the data traffic may include operations, features, means, or instructions for determining a type of bearer associated with the data traffic, a QoS metric associated with the data traffic, a priority associated with the data traffic, delay sensitivity metric associated with the data traffic, a reliability metric associated with the data traffic, or any combination thereof, where determining the second PDCP discard timer may be based on the type of bearer, the QoS metric, the delay sensitivity metric, the reliability metric, or any combination thereof.

In some examples of the method, apparatuses, and non-transitory computer-readable medium described herein, a first duration of the first PDCP discard timer may be less than a second duration of the second PDCP discard timer.

Some examples of the method, apparatuses, and non-transitory computer-readable medium described herein may further include operations, features, means, or instructions for determining that a quantity of the data traffic that may be to be transmitted according to the uplink grant may be greater than or equal to a data traffic threshold, where determining the set of conditions may be based on determining the quantity of the data traffic may be greater than or equal to the data traffic threshold.

Some examples of the method, apparatuses, and non-transitory computer-readable medium described herein may further include operations, features, means, or instructions for determining an indication of the quantity of data traffic based on a buffer status report (BSR), where determining the quantity of data traffic may be greater than or equal to the data traffic threshold may be based on the BSR.

Some examples of the method, apparatuses, and non-transitory computer-readable medium described herein may further include operations, features, means, or instructions for receiving, from a base station, an indication of a data rate for uplink transmissions performed by the UE, and determining that the data rate for the uplink transmissions may be greater than or equal to a maximum data rate associated with the uplink grant, where determining the set of conditions may be based on determining the data rate for the uplink transmissions may be greater than or equal to the maximum data rate associated with the uplink grant.

Some examples of the method, apparatuses, and non-transitory computer-readable medium described herein may further include operations, features, means, or instructions for determining that a power level for transmitting uplink transmissions may be less than or equal to a threshold power level, where determining the set of conditions may be based on determining the power level may be less than or equal to the threshold power level.

Some examples of the method, apparatuses, and non-transitory computer-readable medium described herein may further include operations, features, means, or instructions for determining that a thermal level of the UE may be greater than or equal to a threshold thermal level, where determining the set of conditions may be based on determining the thermal level may be greater than or equal to the threshold thermal level.

In some examples of the method, apparatuses, and non-transitory computer-readable medium described herein, transmitting the data traffic using the second PDCP discard timer may include operations, features, means, or instructions for refraining from transmitting data units of the data traffic based on the second PDCP discard timer.

In some examples of the method, apparatuses, and non-transitory computer-readable medium described herein, refraining from transmitting the data units of the data traffic based on the second PDCP discard timer may include operations, features, means, or instructions for determining reception times at which each of the data units of the data traffic may be received at a buffer of the UE, determining buffer durations associated with each of the data units of the data traffic based on the reception times, and discarding data units which include buffer durations which may be greater than or equal to a duration of the second PDCP discard timer.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
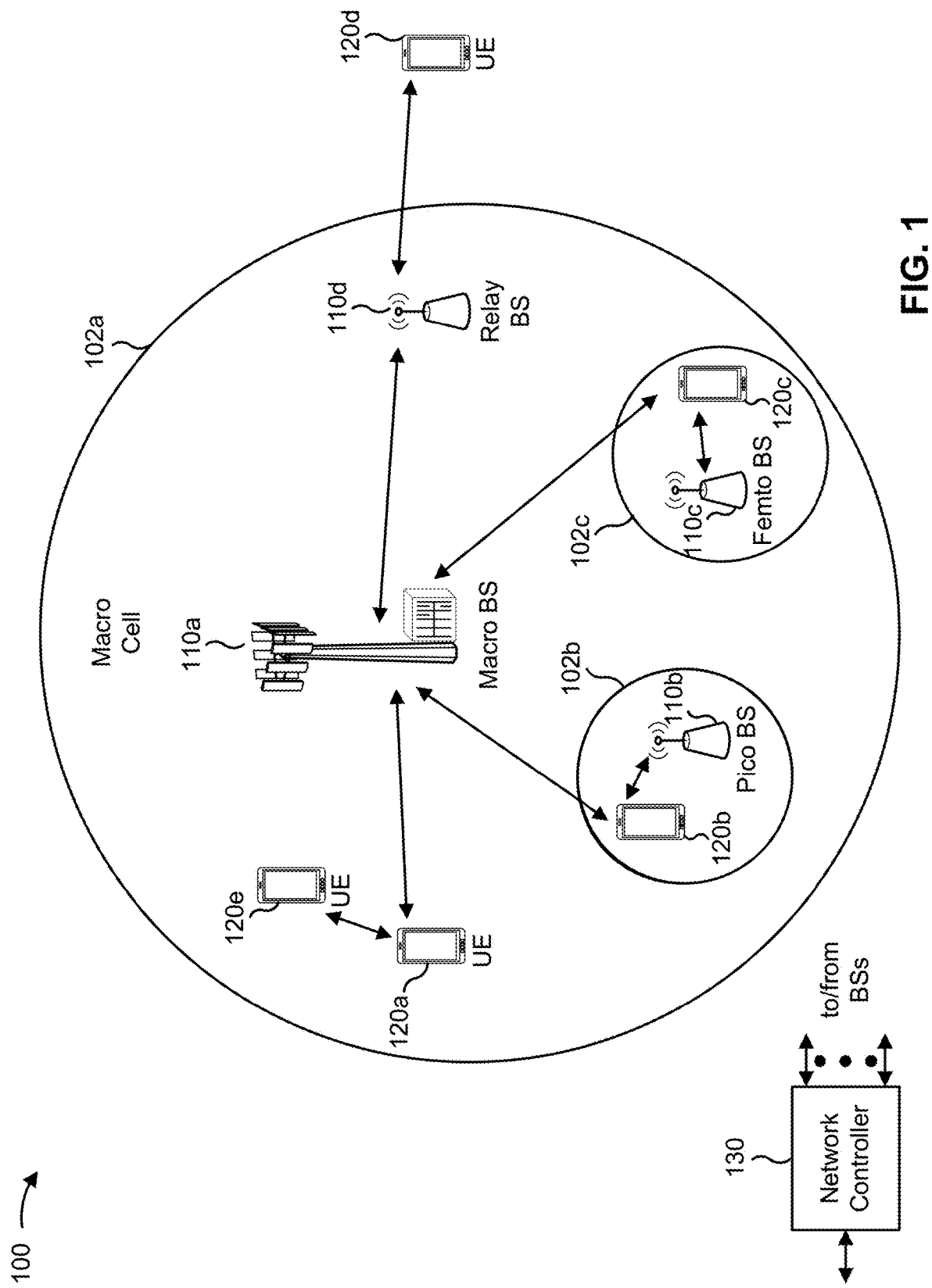
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

The UEs 120 and the base stations 110 of the wireless network 100 may support techniques for dynamic packet data convergence protocol (PDCP) discard timer adjustment. In particular, the UEs 120 of the wireless network 100 may be configured to dynamically adjust PDCP discard timers and/or dynamically select new PDCP discard timers based on conditions associated with a data rate of an uplink grant, sets of parameters associated with uplink data traffic, or both. By selectively adjusting and/or selecting new PDCP discard timers which may be used to transmit data traffic, the UEs 120 of the wireless network 100 may reduce and/or eliminate a quantity of data units (e.g., protocol data units (PDUs), service data units (SDUs)) which are discarded by PDCP discard timers in response to short, intermittent interruptions in wireless communications.

For example, a UE 120 of the wireless network 100 may identify data traffic that is to be transmitted according to an uplink grant using a first PDCP discard timer (e.g., a timer value of a timer associated with discarding a PDCP SDU). The uplink grant, the first PDCP discard timer, or both, may be configured by the network (e.g., signaled to the UE 120 via a base station 110). In some aspects, the data traffic may be associated with an application or program which is executed or implemented by the UE 120. For instance, the identified data traffic may be associated with a video messaging application or service (e.g., FaceTime, WebEx, Zoom), a gaming application or service, a virtual reality/augmented reality application or service, a file transfer protocol (FTP), an internet browsing session or application, or any combination thereof.

In some aspects, the UE 120 may determine a set of conditions (e.g., a timer modification condition) associated with the uplink grant and/or the UE 120 itself which are associated with a data rate (e.g., throughput) of the uplink grant. In particular, the UE 120 may determine a set of conditions which may negatively affect a data rate associated with the uplink grant, such as a condition associated with an uplink grant limited scenario or a compression/recompression condition. For example, the UE may identify conditions (e.g., radio link conditions, UE 120 conditions) which may result in short, intermittent interruptions to wireless transmissions that may inhibit transmission of the data traffic and cause the first PDCP discard timer to discard data units. The set of conditions may include a quantity of data traffic in a buffer of the UE 120, a data rate allocated for uplink transmissions configured by the network, a maximum data rate of the uplink grant allocated for the UE 120, thermal/power levels at the UE 120 which may inhibit uplink transmissions, or any combination thereof.

For example, the UE 120 may determine that a data rate allocated for a video messaging application (e.g., FaceTime) exceeds a maximum data rate associated with the uplink grant allocated for the UE 120. In this example, the UE 120 may determine that the data traffic associated with the video messaging application may accumulate within a buffer of the UE 120 faster than the UE 120 may transmit the data traffic using the uplink grant. In this regard, the UE 120 may identify that this condition is associated with the uplink grant and may result in a discard of data units according to the first PDCP discard timer. By way of another example, the UE 120 may determine that a thermal profile and/or power profile of the UE 120 exceeds a respective threshold and may therefore lead to temporary throttling of uplink transmissions. In this example, the UE 120 may determine that the thermal profile and/or power profile of the UE 120 may temporarily reduce a transmission rate of the data traffic, and may therefore lead to a discard of data units according to the first PDCP discard timer.

Upon identifying that the determined set of conditions may result in dropped data units, the UE 120 may identify a set of parameters associated with the data traffic. Parameters associated with the data traffic may include a type of data traffic (e.g., video messaging data traffic, gaming data traffic, internet browsing data traffic), a type of bearer associated with the data traffic (e.g., signaling radio bearer (SRB), dedicated radio bearer (DRB)), QoS requirements of the data traffic, delay sensitivity of the data traffic (e.g., how dependent user experience is on temporary delays), priority of the data traffic, or any combination thereof. In this regard, the UE 120 may determine the set of conditions associated with the data traffic to determine whether or not the UE 120 should dynamically adjust the first PDCP discard timer (e.g., modify the timer value of the timer) which will be used for transmitting the data traffic.

Accordingly, the UE 120 may determine a second PDCP discard timer (e.g., may modify the timer value) based on the determined set of parameters associated with the data traffic. For example, in some cases, the UE 120 may determine that the data traffic (such as video messaging data traffic) is highly sensitive to delays (e.g., delays due to application-level retransmissions) and has budget for an extended PDCP discard timer from end-to-end flow level delay characteristics. In such cases, the UE 120 may extend (e.g., lengthen) the first PDCP discard timer to generate the second PDCP discard timer and may utilize the second PDCP discard timer to transmit the data traffic. By utilizing a second PDCP discard timer which is longer than the first PDCP discard timer, the UE 120 may reduce a quantity of data units which are dropped (e.g., discarded) according to the respective PDCP discard timer, thereby improving user experience and overall QoS.

In some aspects, the UE 120 may apply the second PDCP discard timer on a per-bearer basis, based on a type of data traffic, or both. For example, the UE 120 may determine one or more bearers associated with the data traffic and may apply the second PDCP discard timer only for transmissions over the one or more bearers associated with the data traffic. By way of another example, the UE 120 may determine a first type of data traffic which is more sensitive to delays (e.g., video messaging data traffic), and a second type of data traffic which is less sensitive to delays (e.g., internet browsing data traffic). In this example, the UE 120 may apply the second PDCP discard timer only for transmissions of the first type of data traffic.

Additionally, or alternatively, the UE 120 may apply the second PDCP discard timer for a given (e.g., predetermined) duration of time. In this regard, a new and/or selectively adjusted PDCP discard timer may be associated with a validity period. For example, upon identifying conditions which may negatively affect an ability for the UE 120 to transmit data traffic and determining parameters associated with the data traffic, the UE 120 may be configured to utilize a second (e.g., extended) PDCP discard timer for a determined validity period. In this example, the UE 120 may transmit the data traffic using the second PDCP discard timer for the validity period of the second PDCP discard timer and may subsequently transmit the data traffic using the first PDCP discard timer after an expiration of the validity period. In this regard, in some cases, techniques described herein may be configured to address short, intermittent interruptions in wireless communications rather than longer, persistent periods of poor wireless communications quality.

Techniques described herein may support dynamic adjustment of PDCP discard timers. In particular, techniques described herein may enable a UE 120 to selectively adjust PDCP discard timers (or select new PDCP discard timers) in order to reduce or eliminate a quantity of data units which are discarded in response to short, intermittent interruptions to wireless communications. By enabling the dynamic adjustment of PDCP discard timers, techniques described herein may improve the quality and efficiency of wireless communications within the wireless network 100 and may improve overall user experience.

As indicated above, FIG. 1 is provided as an example. Other examples may differ from what is described with regard to FIG. 1.

Figure 2:
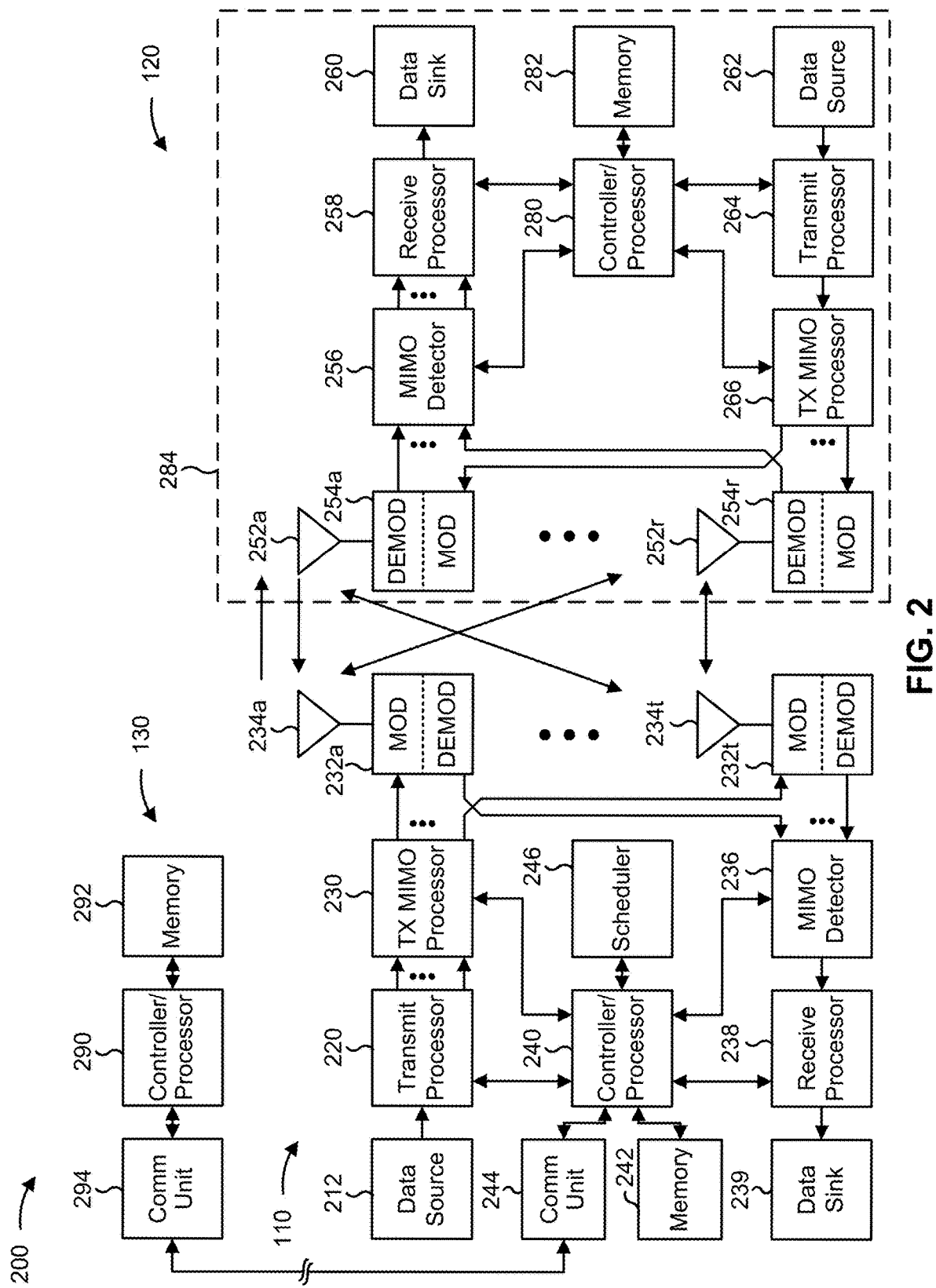
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with timer adjustment for packet loss, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8 and/or other processes as described herein. In some aspects, executing instructions may include running the instructions, converting the instructions, compiling the instructions, and/or interpreting the instructions.

In some aspects, UE 120 may include means for receiving information indicating a timer value of a timer associated with discarding a PDCP SDU; means for determining that a timer modification condition is satisfied; means for modifying the timer value based at least in part on the determination that the timer modification condition is satisfied; and means for transmitting a communication using the modified timer value. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
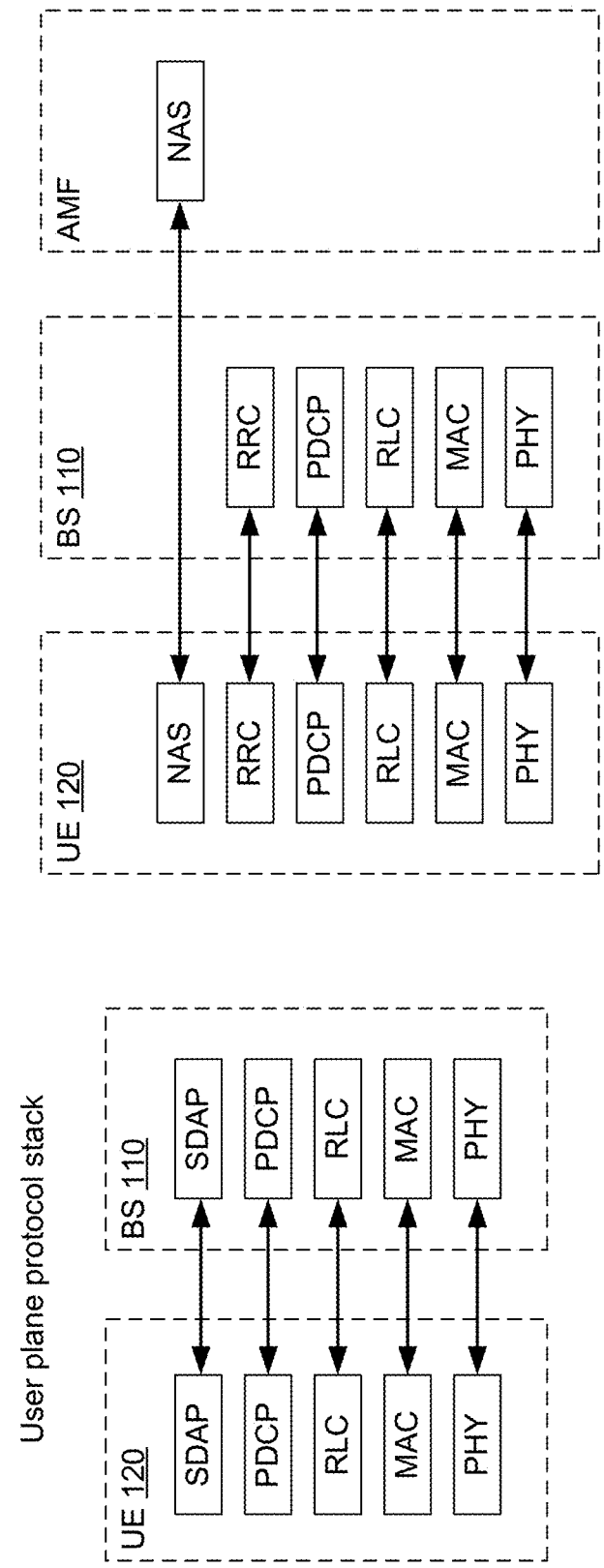
FIG. 3 is a diagram illustrating an example of a user plane protocol stack and a control plane protocol stack for a base station and a core network in communication with a UE, in accordance with the present disclosure.

FIG. 3 is a diagram illustrating an example 300 of a user plane protocol stack and a control plane protocol stack for a base station 110 and a core network in communication with a UE 120, in accordance with the present disclosure.

On the user plane, the UE 120 and the BS 110 may include respective physical (PHY) layers, medium access control (MAC) layers, radio link control (RLC) layers, PDCP layers, and service data adaptation protocol (SDAP) layers. A user plane function may handle transport of user data between the UE 120 and the BS 110. On the control plane, the UE 120 and the BS 110 may include respective radio resource control (RRC) layers. Furthermore, the UE 120 may include a non-access stratum (NAS) layer in communication with an NAS layer of an access and management mobility function (AMF). The AMF may be associated with a core network associated with the BS 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 3, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of SRBs and DRBs; mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the BS 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted, and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP PDU routing (in case of split bearers), retransmission of PDCP SDUs, ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARD), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the BS 110 is receiving an uplink communication), the operations may be similar to those described for the transmitting side, but reversed. For example, the PHY layer may receive TBs, and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

As indicated above, FIG. 3 is provided as an example. Other examples may differ from what is described with regard to FIG. 3.

A DRB can be configured with a discard timer. The discard timer indicates a time after which a given SDU is to be discarded, if the given SDU has not been transmitted for any reason. For example, the PDCP layer may receive a PDCP SDU, and may buffer the PDCP SDU for transmission. The PDCP layer may start the timer for the PDCP SDU upon reception. When the discard timer expires for the PDCP SDU, or the PDCP SDU is successfully delivered, the PDCP entity may discard the PDCP SDU along with a corresponding PDCP data PDU (if generated). If the corresponding PDCP data PDU has been provided to a lower layer, then the discard is indicated to the lower layer. The discarding of PDCP SDUs may conserve resources of the UE in scenarios when communications of the UE have been interrupted for some reason, or in scenarios when higher-priority traffic is prioritized over lower-priority traffic (e.g., PDCP SDUs of the lower-priority traffic may be dropped). The PDCP discard timers are intended to meet end-application and QoS requirements. In particular, by dropping (e.g., discarding) "stale" data units according to the PDCP discard timer, the UE may prevent delaying transmission of subsequent data units, thereby improving overall QoS.

In some cases, dynamic radio conditions may result in short, intermittent interruptions in wireless communications, thereby causing data units to be frequently discarded based on the PDCP discard timer, and diminishing end-user experience. While these short, intermittent interruptions in may be unlikely to negatively affect the quality of wireless communications in the long term, current PDCP discard timer techniques may nonetheless result in frequently dropped data units, thereby diminishing the QoS. For example, there are various conditions in which dropping a PDCP SDU may lead to packet loss that is more detrimental to the performance of the UE than buffering the PDCP SDU for a longer period of time than prescribed by the discard timer. Two of these conditions include uplink grant limited scenarios and compression/recompression scenarios.

An uplink grant limited scenario is a scenario in which the UE has more data to transmit than can be accommodated by the uplink grants available to the UE. In some aspects, an uplink grant limited scenario may be caused by a thermal mitigation condition. A thermal mitigation condition may be associated with a temperature threshold. When the UE heats up due to processing needs during a high-throughput scenario, the UE may determine that the thermal mitigation condition is satisfied based at least in part on the temperature threshold. If the thermal mitigation condition is satisfied, the UE may modify a BSR to indicate less buffered traffic than is actually present at the UE (or even zero buffered traffic, if the UE's temperature is sufficiently high), thereby reducing the number of uplink grants provided to the UE and reducing the processing load at the UE. However, the thermal mitigation condition may last an indeterminate amount of time (e.g., longer than the discard timer), which may increase the chance of a PDCP SDU discard occurring.

Another example of an uplink grant limited scenario is associated with a long tune away, which may be performed by a multiple subscriber identity module (multi-SIM) UE. For example, a dual subscriber identity module (SIM) dual standby UE may have one SIM enter a long tune away (referred to as a gap associated with a dual SIM dual standby configuration) while another SIM performs active transmission. The duration of the gap may be indeterministic, and may exceed the length of the discard time, which may increase a chance of a PDCP SDU discard occurring.

A third example of an uplink grant scenario is associated with a PHY layer block error rate (BLER), leading to frequent HARQ retransmissions. The frequent HARQ retransmissions may lead to delays in transmitting new traffic. In some cases, a delay may exceed the length of the discard time, thus increasing the chance of a PDCP SDU discard occurring.

The compression/recompression scenario may relate to robust header compression (ROHC) or uplink data compression (UDC). In ROHC and UDC, if a packet on a given bearer is lost or discarded (e.g., due to a PDCP SDU discard), all subsequent packets on the given bearer may need to be recompressed due to how ROHC and UDC are performed, which leads to significant processing burden, and which increases the likelihood of one or more of the subsequent packets also being discarded.

Some techniques and apparatuses described herein enable the adjustment of a timer value of a PDCP discard timer (referred to herein as a timer associated with discarding a PDCP SDU) based at least in part on a timer modification condition. The adjustment of the timer value may be considered as determining a second PDCP discard timer, where an initial timer value of the PDCP discard timer may be considered a first PDCP discard timer. For example, the timer modification condition may relate to an uplink grant limited scenario or a compression/recompression scenario, as described above. In some aspects, the UE may lengthen the timer value (e.g., so that a given PDCP SDU is buffered longer, which decreases the chance of the given PDCP SDU being dropped). In some aspects, the UE may disable the PDCP discard timer, which further decreases the chances of a given PDCP SDU being dropped. In some aspects, the UE may apply the second PDCP discard timer for a predetermined duration of time, on a per-bearer basis, or both. Additionally, or alternatively, the UE may apply the second PDCP discard timer dependent upon the type of data traffic at issue (e.g., priority of the data traffic, delay sensitivity of the data traffic). Thus, a discard rate of the UE is decreased, which improves throughput and which conserves processing resources of the UE. The techniques and apparatuses described herein may be particularly beneficial for non-real time traffic.

FIGS. 4-7 are diagrams illustrating examples 400, 500, 600, and 700 of modifying a timer value of a PDCP discard timer based at least in part on a timer modification condition, in accordance with the present disclosure. As shown, examples 400, 500, 600, and 700 include a UE 120 and a BS 110. Examples 400, 500, and 600 all show examples of modifying a timer value based at least in part on an uplink grant limited scenario. Thus, a reference to modifying a timer value based at least in part on an uplink grant limited scenario can refer to any one or more of examples 400, 500, and 600. In some aspects, an uplink grant limited scenario may be based at least in part on a data rate of an uplink grant. For example, if the data rate of the uplink grant is limited based at least in part on one or more of the conditions described herein, the UE may be considered to be in an uplink grant limited scenario. Example 700 is an example relating to modifying a timer value based at least in part on a compression/recompression condition.

In some aspects, the timer modification condition may relate to a dual connectivity scenario. In a dual connectivity scenario, a UE 120 can maintain two or more connections using one or more radio access technologies (RATs). Examples include multi-radio dual connectivity (DC) (MR-DC), E-UTRA-NR DC (EN-DC), and NR-DC. In a dual connectivity scenario, the timer modification condition (such as a BLER based condition, a multi subscriber identity module (SIM) gap, a thermal mitigation condition, or the like) can be triggered on one or both connections.

In some aspects, the timer modification condition may relate to a dual SIM dual active (DSDA) configuration. In a DSDA configuration, the UE 120 is associated with two SIMS (and therefore two subscribers). Both of the two SIMS may maintain concurrent active connections with the network. In a DSDA configuration, radio frequency (RF) resources may be shared between the two SIMs. Therefore, uplink transmission loss may occur due to the shared RF resources. In a DSDA configuration, the timer modification condition can be satisfied due to uplink transmission loss associated with shared RF resources, such as if a number or ratio of uplink transmissions on a given SIM are interrupted.

In some aspects, the timer modification condition may relate to a non-terrestrial network (NTN). For example, NTNs may be subject to scheduling pattern differences, in which different UEs covered by a base station may use different scheduling patterns, or in which a UE and a base station use different scheduling patters. The differences in scheduling patterns of an NTN may cause interruption to uplink communications of a UE 120. The timer modification condition may indicate a threshold associated with the interruption to uplink communications, such as a threshold block error rate, a threshold number of failed communications, or the like.

In some aspects, the timer modification condition may relate to a radiation threshold, such as a maximum permissible exposure (MPE) threshold or a specific absorption rate (SAR) threshold. For example, an MPE threshold or a SAR threshold may cause throttling or restriction of certain transmission resources, such as transmit power, uplink resources, particular beam directions, or the like. Such throttling or restrictions may cause interruptions to uplink transmissions of the UE. The timer modification condition may be based at least in part on a threshold associated with a SAR or MPE restriction, such as a threshold block error rate, a threshold number of failed communications, a presence of a SAR or MPE restriction, or the like.

In some aspects, the timer modification condition may relate to interference associated with coexistence of radio access technologies (RATs). For example, operations associated with a first RAT may cause interference to communications associated with a second RAT. In some aspects, the timer modification condition may be based at least in part on a threshold associated with interference due to coexistence, such as a threshold block error rate, a threshold number of failed communications, a coexistence condition (e.g., based at least in part on identifying that a first RAT is interfering with a second RAT), or the like.

In some aspects, the timer modification condition may relate to unlicensed spectrum. For example, UEs 120 operating in unlicensed spectrum may be subject to listen-before-transmit (LBT) requirements, in which a UE 120 must listen to the channel for an amount of time before reserving resources of the channel for a transmission. A failure of LBT may lead to the UE 120 not having sufficient resources for transmission of an uplink or sidelink communication. In some aspects, the timer modification condition may be based at least in part on a threshold associated with unlicensed spectrum, such as a threshold block error rate, a threshold number of failed communications, an unlicensed spectrum condition (e.g., based at least in part on identifying that a failure of LBT has led to an interruption in a communication of the UE 120), or the like.

Figure 4:
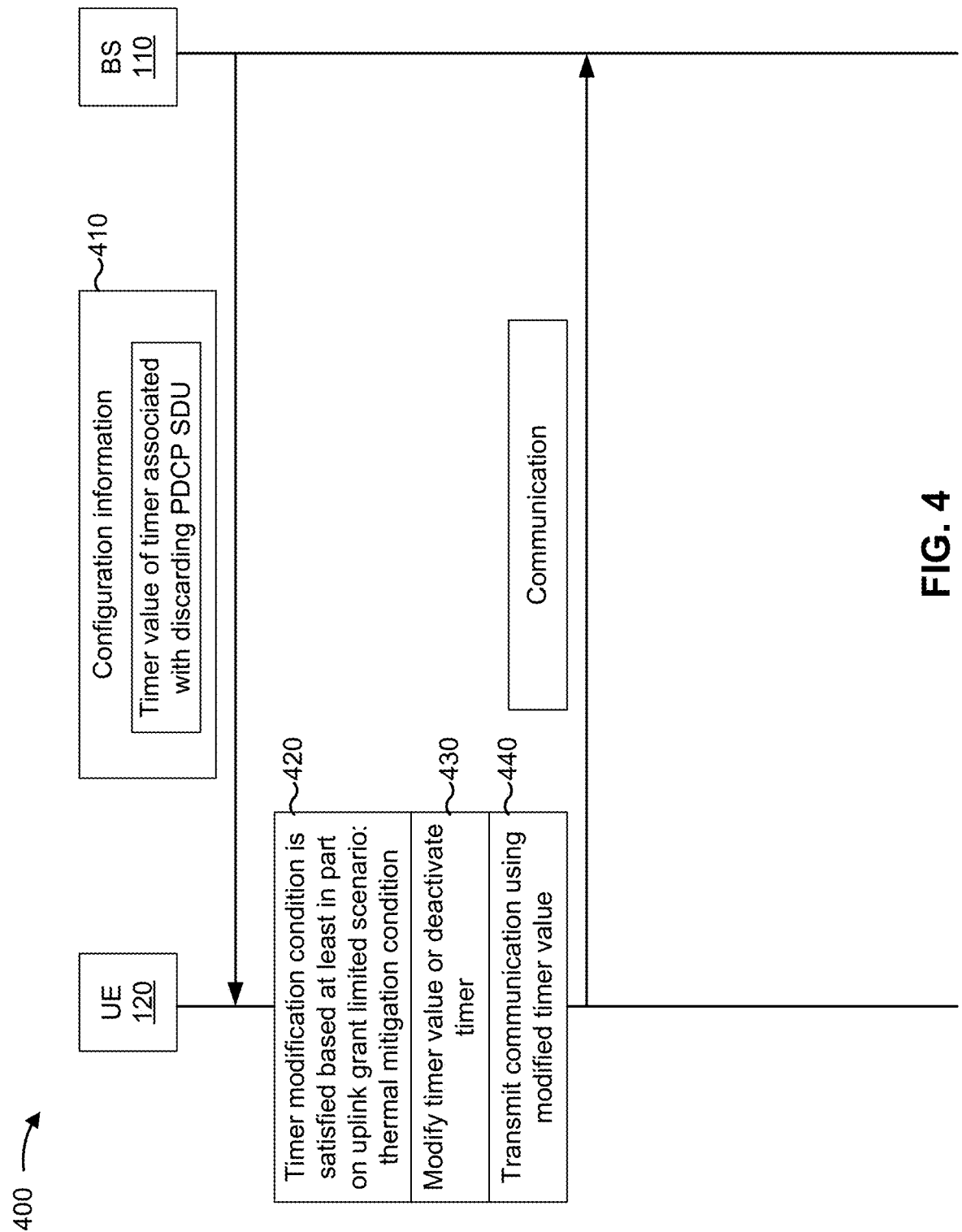
FIGS. 4-7 are diagrams illustrating examples of modifying a timer value of a packet data convergence protocol (PDCP) discard timer based at least in part on a timer modification condition, in accordance with the present disclosure.

Example 400 of FIG. 4 is an example where the timer modification condition is based at least in part on a thermal mitigation condition of the UE 120.

As shown by reference number 410, the BS 110 may transmit configuration information to the UE 120. As shown, the configuration information may indicate a timer value of a timer associated with discarding a PDCP SDU. For example, the configuration information may indicate a configuration for a PDCP discard timer of the UE 120, such as an initial value associated with the PDCP discard timer or the like. In some aspects, the configuration information may be associated with a bearer. In some aspects, the configuration information may indicate a timer modification condition. For example, the configuration information may indicate a threshold associated with the timer modification and may indicate how to modify the timer value based at least in part on the threshold. Examples of timer modification conditions and corresponding modifications to timer values are described in more detail below.

As shown by reference number 420, the UE 120 may determine that a timer modification condition is satisfied. In example 400, the timer modification condition is based at least in part on a thermal mitigation condition at the UE 120. For example, the UE 120 may be configured with a threshold temperature. If a temperature associated with the UE 120 satisfies the threshold (meaning that the thermal mitigation condition is satisfied), then the UE 120 may modify a buffer status report in order to indicate a decreased buffer status (e.g., less data in the UE 120's buffer), thereby reducing the number of uplink grants provided to the UE 120 and decreasing uplink throughput. By decreasing uplink throughput, the UE 120's processor usage may be decreased, thereby reducing temperature. However, decreasing uplink throughput may increase the number of PDCP SDUs that are dropped based at least in part on the timer associated with discarding PDCP SDUs, thereby increasing processor usage and degrading the UE 120's communication performance.

As shown by reference number 430, the UE 120 may modify the timer value, or may disable the timer, based at least in part on the timer modification condition being satisfied. For example, the UE 120 may increase the timer value so that a given PDCP SDU is buffered for a longer time before being dropped, thereby reducing the number of PDCP SDUs that are dropped. As another example, the UE 120 may disable the timer (e.g., while the timer modification condition is satisfied, for a configured length of time, and/or the like) so that PDCP SDUs are buffered until transmission, thereby reducing or eliminating interruption to the UE 120's uplink traffic.

In some aspects, the UE 120 may determine the modified timer value (e.g., may determine how much to modify the timer value) based at least in part on the timer modification condition. For example, the UE 120 may use a plurality of thresholds corresponding to different modified timer values (e.g., different modifications to the timer value). As another example, the UE 120 may use a first threshold to determine that the timer value is to be modified, and a second threshold to determine that the timer is to be disabled. In example 400, the second threshold may correspond to a higher temperature than the first threshold, so that the more aggressive thermal mitigation condition can be mitigated. In some aspects, the modified timer value may be based at least in part on whether the buffer status report is modified to a non-zero value (indicating at least some buffered data at the UE 120) or a zero value (associated with a critical condition, and/or indicating no data in a buffer of the UE 120). For example, the UE 120 may disable the timer based at least in part on the buffer status report being modified to a zero value and may increase the timer value based at least in part on the buffer status report being modified to a non-zero value.

As shown by reference number 440, the UE 120 may transmit a communication using the modified timer value. For example, a PDCP layer of the UE 120 may generate PDCP PDUs for PDCP SDUs in accordance with the modified timer value, such that a larger proportion of PDCP SDUs (or all of the PDCP SDUs) are provided to lower layers for processing and transmission. In this way, the reliability of the UE 120 in an uplink grant limited scenario is improved, which reduces processor usage associated with retransmitting communications and improves utilization of network resources.

Figure 5:
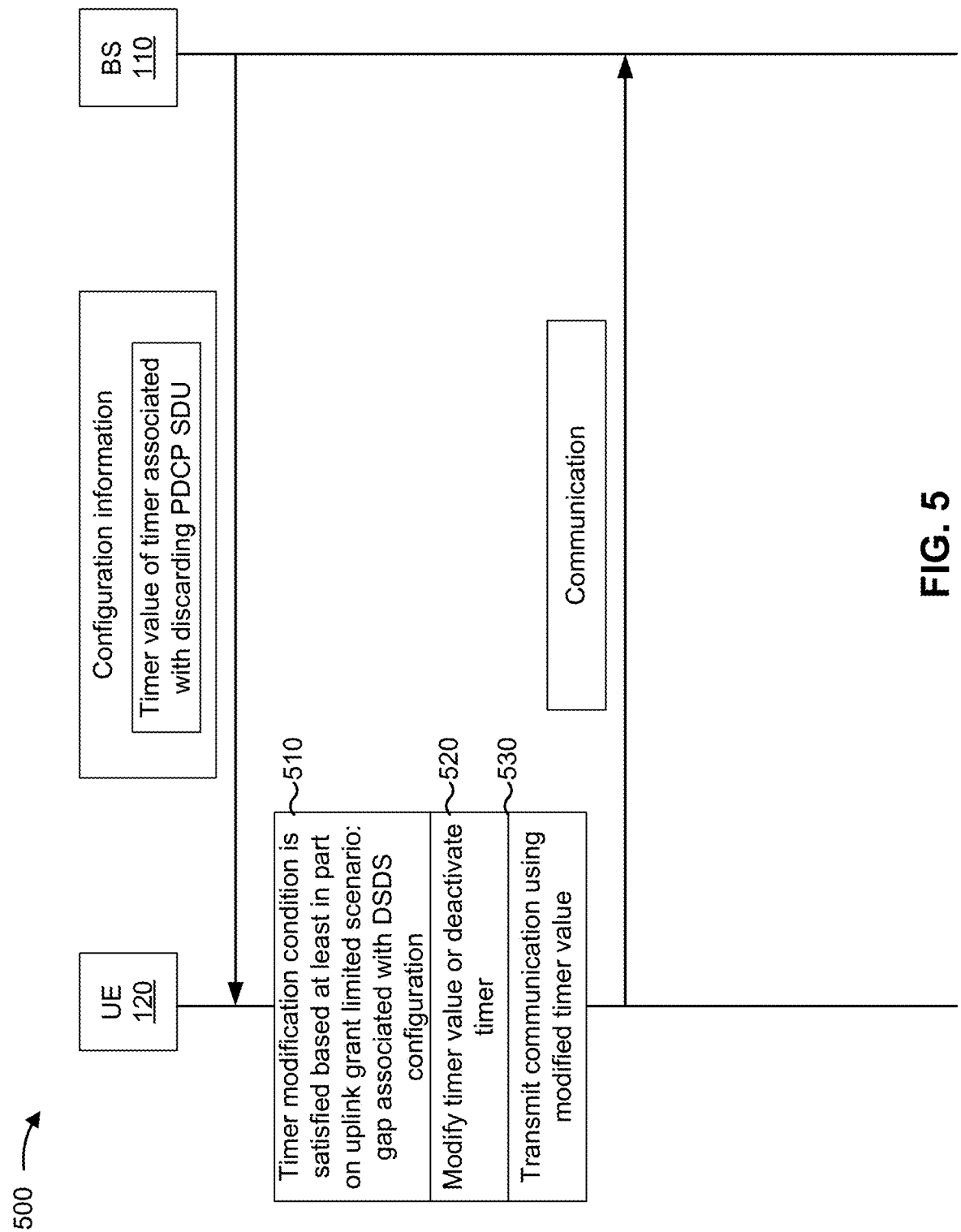

Example 500, in FIG. 5, is an example where the timer modification condition is based at least in part on a gap of the UE 120 associated with a dual SIM dual standby (DSDS) configuration of the UE 120. In example 500, the UE 120 is a DSDS UE, meaning that the UE 120 is associated with two SIMS. One SIM may be active at a time. When a first SIM is active, a second SIM may enter a gap, referred to as a tuning gap or a long tune away, until the second SIM is activated. During the gap, the second SIM's traffic may be buffered by the UE 120. However, the buffering of the traffic may cause a PDCP discard timer of the UE 120 to be exceeded for the traffic, thus causing the UE 120 to drop the traffic, thereby degrading the UE 120's reliability on the uplink and using processing and communication resources associated with retransmitting the traffic.

As shown, the UE 120 may receive configuration information from the BS 110. The configuration information is described in more detail in connection with FIG. 4.

As shown by reference number 510, the UE 120 may determine that a timer modification condition is satisfied. In example 500, the timer modification condition relates to a gap associated with a DSDS configuration (e.g., a long tune away). For example, the UE 120 may determine that a length of the gap satisfies a threshold, that a length of the gap is longer than the timer value of the timer associated with discarding the PDCP SDU, and/or the like. Accordingly, as shown by reference number 520, the UE 120 may modify the timer value or may disable the timer. In some aspects, the UE 120 may increase the timer value so that the length of the timer exceeds the length of the gap. In some aspects, the UE 120 may increase the timer value by an amount equal to the length of the gap. In some aspects, the UE 120 may disable the timer based at least in part on the length of the gap satisfying a threshold. Thus, traffic associated with the gap (e.g., traffic associated with an inactive SIM associated with the gap) may not be dropped due to the timer associated with discarding the PDCP SDU, which improves uplink reliability of the UE 120 and conserves communication and processing resources. As shown by reference number 530, the UE 120 may transmit a communication in accordance with the modified timer value (or in accordance with deactivating the timer), as described in more detail in connection with FIG. 4.

Figure 6:
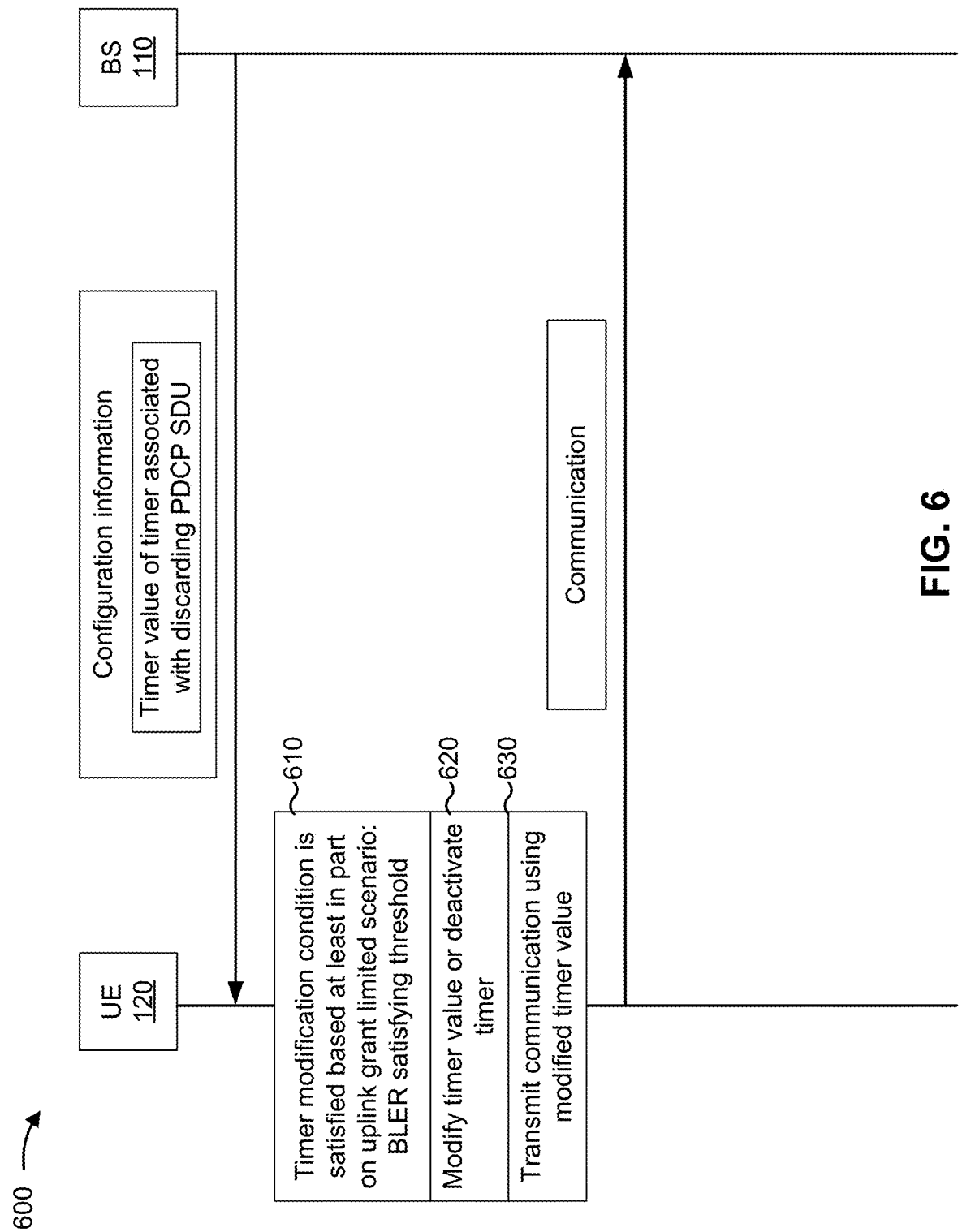

Example 600, in FIG. 6, is an example where the timer modification condition is based at least in part on a BLER of the UE 120. The BLER of the UE 120 is a physical layer parameter that indicates how many blocks (e.g., TBs and/or the like) are unsuccessfully received. A higher BLER corresponds to more unreceived blocks. The UE 120 may perform retransmission of unreceived blocks in accordance with feedback indicating which blocks are received, such as HARQ feedback. The BLER may be determined based at least in part on the feedback. However, the retransmission of unreceived blocks may be prioritized over processing of PDCP SDUs in the PDCP layer of the UE 120, meaning that these PDCP SDUs tend to be buffered for longer periods of time in high-BLER scenarios. Thus, the timer associated with discarding PDCP SDUs is more likely to be exceeded in high-BLER scenarios, which further degrades uplink reliability of the UE 120 and uses processing and communication resources.

As shown, the UE 120 may receive configuration information from the BS 110. The configuration information is described in more detail in connection with FIG. 4.

As shown by reference number 610, the UE 120 may determine that a timer modification condition is satisfied. In example 600, the timer modification condition relates to a BLER of the UE 120. For example, the UE 120 may determine that the BLER satisfies a threshold. Accordingly, as shown by reference number 620, the UE 120 may modify the timer value or may disable the timer. In some aspects, the UE 120 may increase the timer value based at least in part on the BLER satisfying the threshold. In some aspects, the UE 120 may disable the timer based at least in part on the BLER satisfying the threshold. Thus, in a high-BLER scenario, traffic may not be dropped as frequently due to the timer associated with discarding the PDCP SDU, which improves uplink reliability of the UE 120 and conserves communication and processing resources. As shown by reference number 630, the UE 120 may transmit a communication in accordance with the modified timer value (or in accordance with deactivating the timer), as described in more detail in connection with FIG. 4.

In some aspects, the UE 120 may determine the modified timer value (e.g., may determine how much to modify the timer value) based at least in part on the timer modification condition. For example, the UE 120 may use a plurality of thresholds for the BLER, corresponding to different modified timer values (e.g., different modifications to the timer value). As another example, the UE 120 may use a first threshold to determine that the timer value is to be modified, and a second threshold to determine that the timer is to be disabled. In example 600, the second threshold may correspond to a higher BLER than the first threshold, so that the larger delay associated with the higher BLER can be mitigated.

In some aspects, the modified timer value may be based at least in part on an uplink split bearer being configured. For example, in an uplink split bearer scenario (e.g., if an uplink split bearer is configured), if an uplink data split threshold (e.g., a threshold indicating how uplink data is to be split among two or more paths of the uplink split bearer) is set to infinity, and if a primary RLC path is associated with a threshold BLER, then the UE 120 may disable the timer. As another example, in an uplink split bearer scenario, if an uplink data split threshold is set to T, if the primary RLC path is associated with a threshold BLER, and if an outstanding buffer size of the UE 120 is less than T, then the UE 120 may disable the timer.

The examples of uplink grant limited scenarios provided in examples 400, 500, and 600 are just some examples. The techniques and apparatuses described with regard to examples 400, 500, and 600 can be applied for other uplink grant limited scenarios, such as scenarios associated with flow control for a processor, memory, or double data read of the UE 120, a virtual radio link failure (RLF) on a secondary carrier, and/or the like. A virtual RLF is a mechanism for achieving flow control by stopping reception or transmission on a secondary carrier.

Figure 7:
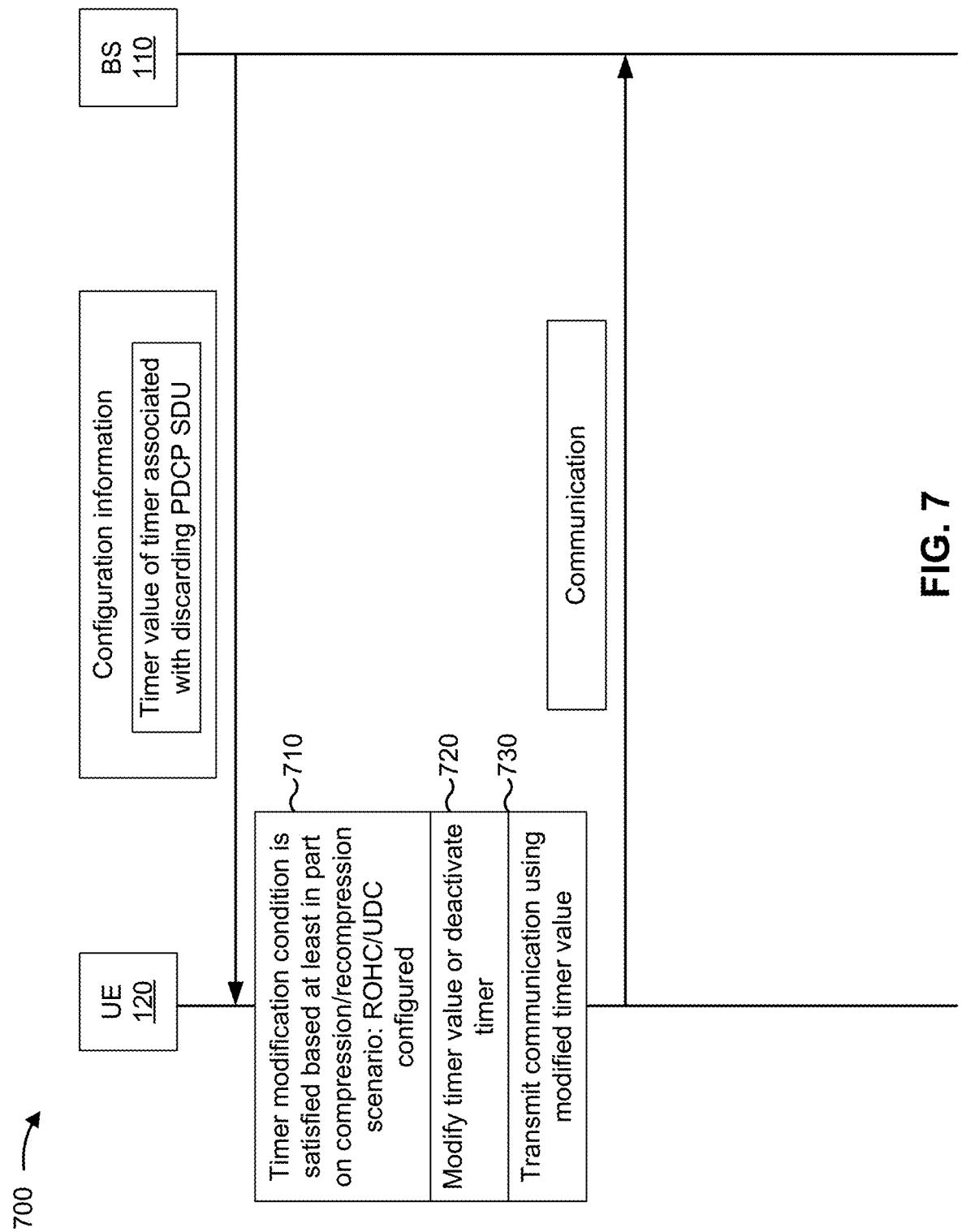

Example 700 of FIG. 7 is an example of modifying a timer value associated with discarding a PDCP SDU based at least in part on a compression/recompression condition. For example, the timer modification condition may be satisfied for a given bearer if ROHC, UDC, or a similar compression algorithm is activated for the given bearer.

As shown, the UE 120 may receive configuration information from the BS 110. The configuration information is described in more detail in connection with FIG. 4.

As shown by reference number 710, the UE 120 may determine that a timer modification condition is satisfied. In example 700, the timer modification condition relates to ROHC or UDC being configured for the UE 120. For example, the UE 120 may determine that ROHC or UDC is configured for a given bearer (e.g., that the given bearer is configured for compression of packets transmitted on the given bearer). As another example, the UE 120 may determine that a threshold number of PDCP SDUs are dropped in connection with ROHC or UDC being configured for the given bearer. Accordingly, as shown by reference number 720, the UE 120 may modify the timer value or may disable the timer. In some aspects, the UE 120 may increase the timer value based at least in part on ROHC or UDC being configured. In some aspects, the UE 120 may disable the timer based at least in part on ROHC or UDC being configured. Thus, dropping of PDCP SDUs may be decreased when uplink compression is activated, which reduces processor usage associated with recompressing transmissions of the UE 120. As shown by reference number 730, the UE 120 may transmit a communication in accordance with the modified timer value (or in accordance with deactivating the timer), as described in more detail in connection with FIG. 4.

In some aspects, the UE 120 may increase a timer value or disable the timer based at least in part on a bearer being configured with Integrity Protection. In this case, the UE 120 may have already computed the Message Authentication Code-Integrity (MAC-I), so discarding packets may cause expensive reprocessing. By disabling the timer, the rate of discarded packets may be decreased, thereby reducing processor usage associated with reprocessing discarded packets and packets associated with (e.g., subsequent to) discarded packets.

As indicated above, FIGS. 4-7 are provided as examples. Other examples may differ from what is described with regard to FIGS. 4-7.

Figure 8:
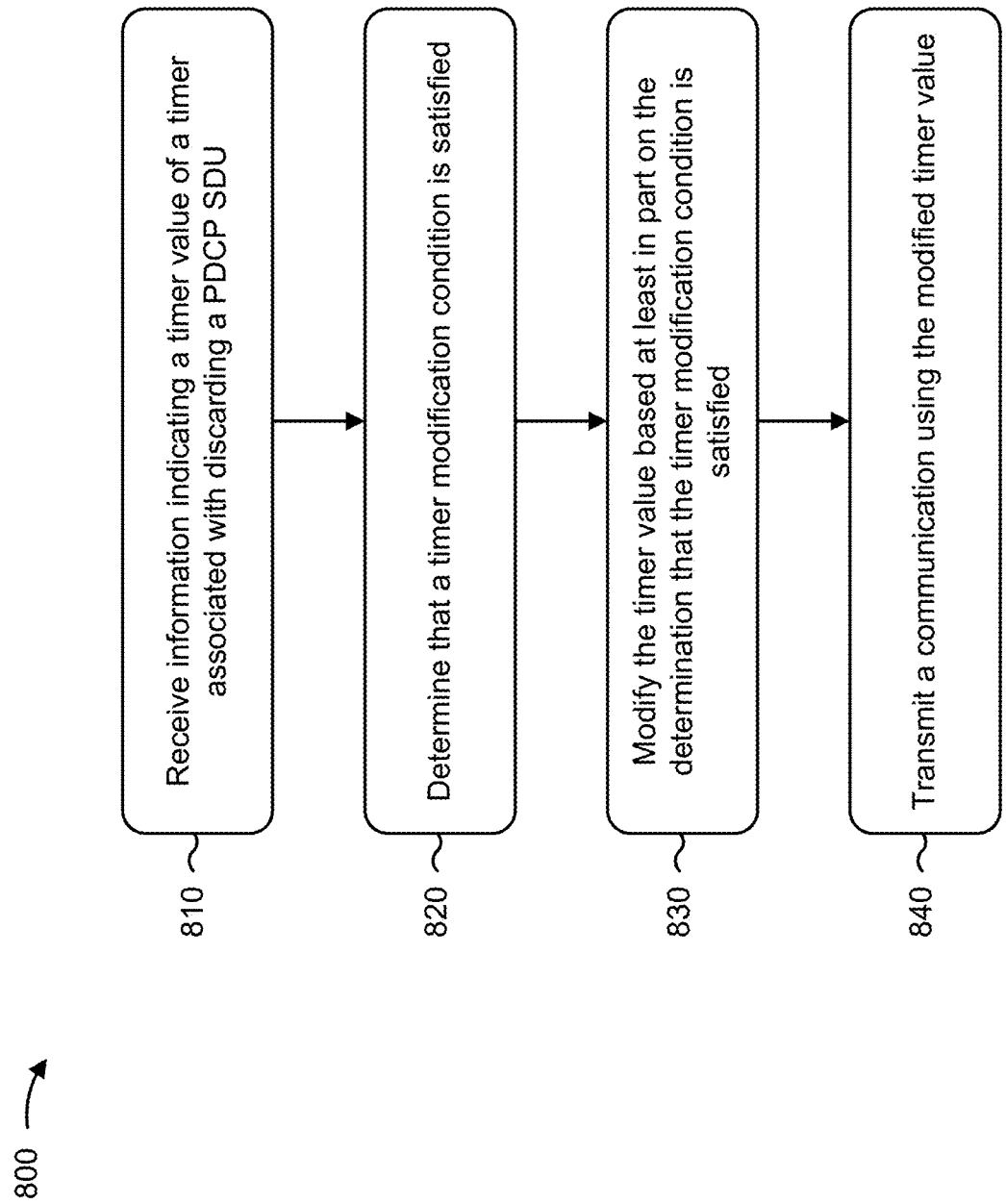
FIG. 8 is a diagram illustrating an example process 800 performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with techniques for timer adjustment for packet loss.

As shown in FIG. 8, in some aspects, process 800 may include receiving information indicating a timer value of a timer associated with discarding a PDCP SDU (block 810). For example, the UE (e.g., using reception component 902 of FIG. 9) may receive information indicating a timer value of a timer associated with discarding a PDCP SDU, as described above.

As further shown in FIG. 8, in some aspects, process 800 may include determining that a timer modification condition is satisfied (block 820). For example, the UE (e.g., using determination component 908 of FIG. 9) may determine that a timer modification condition is satisfied, as described above.

As further shown in FIG. 8, in some aspects, process 800 may include modifying the timer value based at least in part on the determination that the timer modification condition is satisfied (block 830). For example, the UE (e.g., using modification component 910 of FIG. 9) may modify the timer value based at least in part on the determination that the timer modification condition is satisfied, as described above.

As further shown in FIG. 8, in some aspects, process 800 may include transmitting a communication using the modified timer value (block 840). For example, the UE (e.g., using transmission component 904 of FIG. 9) may transmit a communication using the modified timer value, as described above.

Process 800 may include additional aspects, such as any single aspect or any combination of aspects described below and/or in connection with one or more other processes described elsewhere herein.

In a first aspect, the timer modification condition is associated with an uplink grant limited scenario.

In a second aspect, alone or in combination with the first aspect, the uplink grant limited scenario is based at least in part on the UE modifying a buffer status report of the UE due to a thermal mitigation condition being satisfied.

In a third aspect, alone or in combination with one or more of the first and second aspects, the timer modification condition is based at least in part on the thermal mitigation condition, and the timer modification condition indicates to increase the timer value based at least in part on the thermal mitigation condition being satisfied.

In a fourth aspect, alone or in combination with one or more of the first through third aspects, the timer is disabled based at least in part on the buffer status report being modified to indicate no data in a buffer of the UE.

In a fifth aspect, alone or in combination with one or more of the first through fourth aspects, the uplink grant limited scenario is based at least in part on a gap associated with a dual subscriber identity module dual standby configuration.

In a sixth aspect, alone or in combination with one or more of the first through fifth aspects, the timer is disabled based at least in part on with a length of the gap being indeterminate at a time of initiation of the gap.

In a seventh aspect, alone or in combination with one or more of the first through sixth aspects, the timer modification condition is based at least in part on a length of the gap satisfying a threshold.

In an eighth aspect, alone or in combination with one or more of the first through seventh aspects, the timer value is increased by a value equal to the length of the gap.

In a ninth aspect, alone or in combination with one or more of the first through eighth aspects, the timer is disabled based at least in part on the length of the gap satisfying the threshold.

In a tenth aspect, alone or in combination with one or more of the first through ninth aspects, the uplink grant limited scenario is based at least in part on a BLER of the UE.

In an eleventh aspect, alone or in combination with one or more of the first through tenth aspects, the timer value is increased based at least in part on the BLER satisfying a threshold.

In a twelfth aspect, alone or in combination with one or more of the first through eleventh aspects, process 800 includes determining (e.g., using determination component 908 of FIG. 9) the modified timer value based at least in part on a plurality of thresholds for the BLER.

In a thirteenth aspect, alone or in combination with one or more of the first through twelfth aspects, the timer is disabled based at least in part on the BLER satisfying a threshold.

In a fourteenth aspect, alone or in combination with one or more of the first through thirteenth aspects, the timer is disabled based at least in part on an uplink split bearer being configured for the UE, based at least in part on a primary radio link control entity of the uplink split bearer being associated with a BLER that satisfies a threshold, and based at least in part on a data split threshold of the uplink split bearer being set to infinity.

In a fifteenth aspect, alone or in combination with one or more of the first through fourteenth aspects, the timer is disabled based at least in part on an uplink split bearer being configured for the UE, based at least in part on a primary radio link control entity of the uplink split bearer being associated with a BLER that satisfies a threshold, and based at least in part on a buffer size of the UE being less than a data split threshold of the uplink split bearer.

In a sixteenth aspect, alone or in combination with one or more of the first through fifteenth aspects, the timer modification condition is associated with a bearer configured for compression of packets transmitted on the bearer.

In a seventeenth aspect, alone or in combination with one or more of the first through sixteenth aspects, the timer value is increased based at least in part on the bearer being configured for compression of packets transmitted on the bearer.

In an eighteenth aspect, alone or in combination with one or more of the first through seventeenth aspects, the timer value is disabled based at least in part on the bearer being configured for compression of packets transmitted on the bearer.

In a nineteenth aspect, alone or in combination with one or more of the first through eighteenth aspects, the bearer is configured for robust header compression.

In a twentieth aspect, alone or in combination with one or more of the first through nineteenth aspects, the bearer is configured for uplink data compression.

In a twenty-first aspect, alone or in combination with one or more of the first through twentieth aspects, the timer value is increased or the timer is disabled based at least in part on a bearer of the UE being configured with integrity protection.

In a twenty-second aspect, alone or in combination with one or more of the first through twenty-first aspects, the communication is associated with non-real time traffic.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
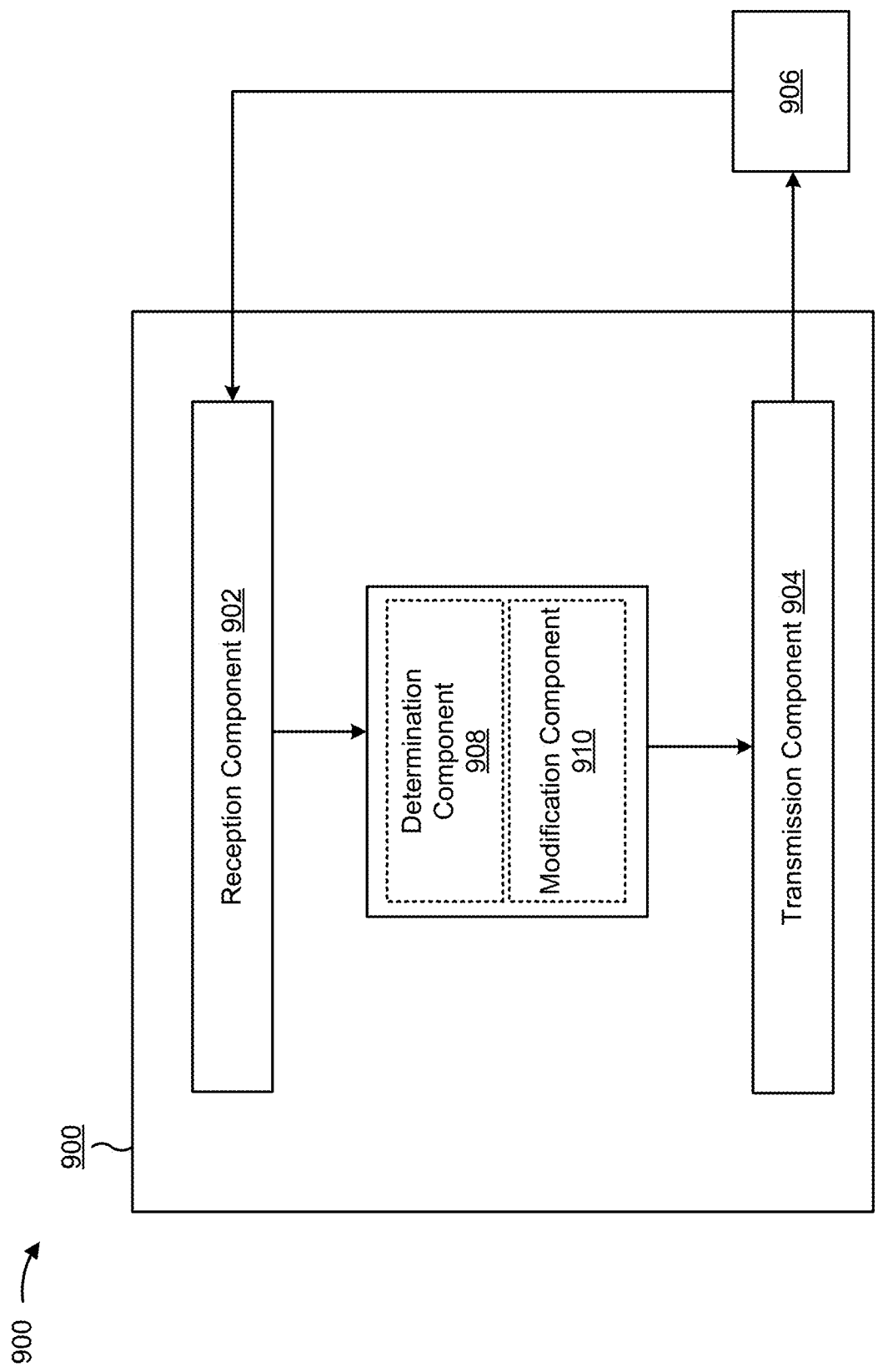
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a determination component 908 or a modification component 910, among other examples.

In some aspects, the apparatus 900 may be configured to perform one or more operations described herein in connection with FIGS. 4-7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The reception component 902 may receive information indicating a timer value of a timer associated with discarding a PDCP SDU. The determination component 908 may determine that a timer modification condition is satisfied. In some aspects, the determination component 908 may determine the modified timer value based at least in part on a plurality of thresholds for a BLER. In some aspects, the determination component 908 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The modification component 910 may modify the timer value based at least in part on the determination that the timer modification condition is satisfied. In some aspects, the modification component 910 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 904 may transmit a communication using the modified timer value.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
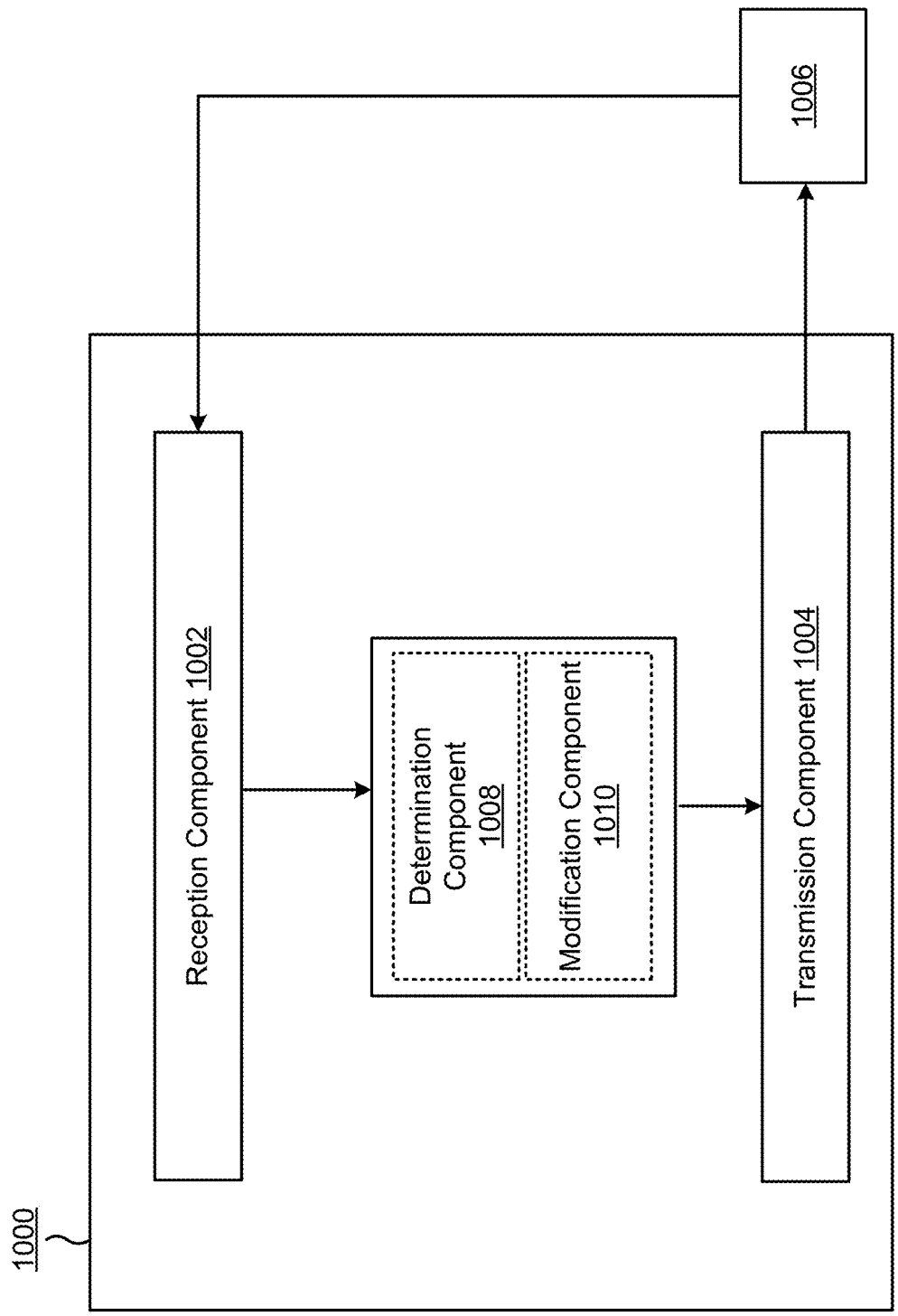

FIG. 10 is a block diagram of an example apparatus 1000 for wireless communication. The apparatus 1000 may be a BS, or a BS may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008 or a modification component 1010, among other examples.

In some aspects, the apparatus 1000 may be configured to perform one or more operations described herein in connection with FIGS. 3-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the BS described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the BS described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the BS described above in connection with FIG. 2. In some aspects, the transmission component 1004 may be collocated with the reception component 1002 in a transceiver.

The transmission component 1004 may transmit information indicating a timer value of a timer associated with discarding a PDCP SDU. The determination component 1008 may determine that a timer modification condition is satisfied. In some aspects, the determination component 1008 may include one or more antennas, a demodulator, a MIMO detector, a receive processor, a modulator, a transmit MIMO processor, a transmit processor, a controller/processor, a memory, or a combination thereof, of the BS described above in connection with FIG. 2. The modification component 1010 may modify the timer value based at least in part on the determination that the timer modification condition is satisfied. In some aspects, the modification component 1010 may include one or more antennas, a demodulator, a MIMO detector, a receive processor, a modulator, a transmit MIMO processor, a transmit processor, a controller/processor, a memory, or a combination thereof, of the BS described above in connection with FIG. 2. The reception component 1002 may receive a communication based at least in part on the modified timer value.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
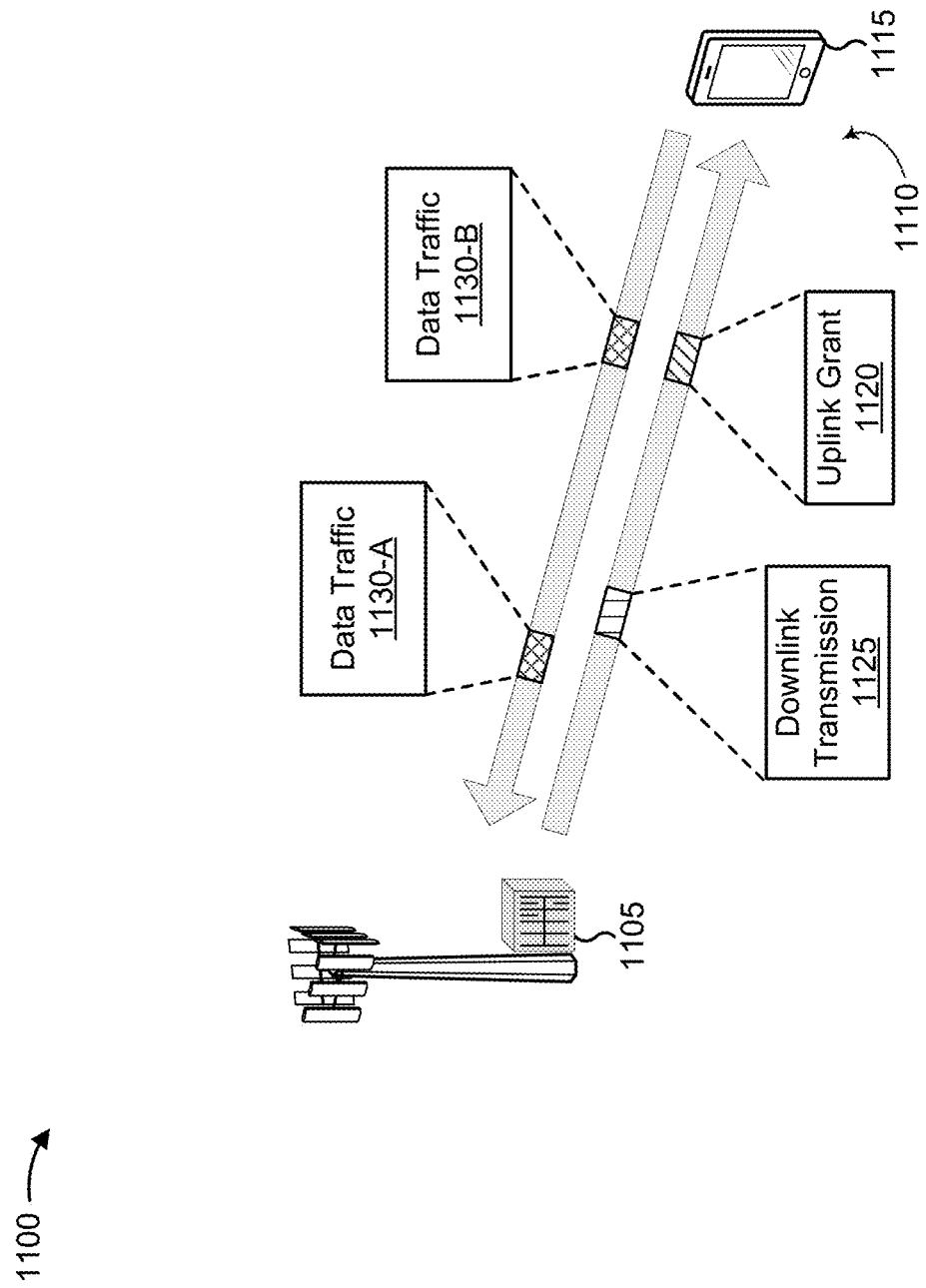
FIG. 11 illustrates an example of a wireless communications system that supports techniques for dynamic PDCP timer adjustment, in accordance with the present disclosure.

FIG. 11 illustrates an example of a wireless communications system 1100 that supports techniques for dynamic PDCP timer adjustment in accordance with the present disclosure. In some examples, wireless communications system 1100 may implement aspects of wireless network 100. The wireless communications system 1100 may include a base station 1105 and a UE 1115, which may be examples of UEs 120 and base stations 110, as described with reference to FIG. 1.

The UE 1115 may communicate with the base station 1105 using a communication link 1110. In some cases, the communication link 1110 may include an example of an access link (e.g., a Uu link). The communication link 1110 may include a bi-directional link that can include both uplink and downlink communication. In one aspect, the UE 1115 may transmit uplink transmissions, such as uplink messages or uplink signals, to the base station 1105 using the communication link 1110, and the base station 1105 may transmit downlink data transmissions, such as downlink messages or downlink signals, to the UE 1115 using the communication link 1110.

In some aspects, the UE 120 may determine a set of conditions associated with the uplink grant and/or the UE 120 itself which are associated with a data rate (e.g., throughput) of the uplink grant. In particular, the UE 120 may determine a set of conditions which may negatively affect a data rate associated with the uplink grant. For example, the UE may identify conditions (e.g., radio link conditions, UE 120 conditions) which may result in short, intermittent interruptions to wireless transmissions that may inhibit transmission of the data traffic and cause the first PDCP discard timer to discard data units. The set of conditions may include a quantity of data traffic in a buffer of the UE 120, a data rate allocated for uplink transmissions configured by the network, a maximum data rate of the uplink grant allocated for the UE 120, thermal/power levels at the UE 120 which may inhibit uplink transmissions, or any combination thereof.

For example, the base station 1105 may transmit, to the UE 1115, an uplink grant 1120 which is to be used by the UE 1115 to transmit uplink transmissions. The uplink grant 1120 may include a set of time resources, a set of frequency resources, a set of spatial resources, or any combination thereof. In some aspects, the uplink grant 1120 may be associated with a given set of data traffic 1130 at the UE 1115, a given type of data traffic 1130 at the UE 1115, or both. In some aspects, the UE 1115 may be configured to determine a maximum data rate (e.g., maximum throughput) associated with the uplink grant 1120.

In some aspects, the base station 1105 may transmit a downlink transmission 1125 to the UE 1115, where the downlink transmission 1125 includes control information, configuration information, or both. For example, the downlink transmission 1125 may include an indication of a first PDCP discard timer which is to be used by the UE 1115 when transmitting uplink transmissions (e.g., uplink transmissions including data traffic 1130). By way of another example, the downlink transmission 1125 may include an indication of a data rate for uplink transmissions to be performed by the UE 1115. For instance, the indication of the data rate within the downlink transmission 1125 may be associated with a given type of data traffic 1130 (e.g., video messaging data traffic 1130) which is to be transmitted by the UE 1115. The downlink transmission may include an RRC message, a configuration message, or both. In some aspects, the information indicated via the downlink transmission 1125 may be associated with uplink transmissions performed according to the uplink grant 1120. In this regard, the base station 1105 may transmit the downlink transmission 1125 based on transmitting the uplink grant 1120.

In some aspects, the UE 1115 may determine a first PDCP discard timer. In some aspects, the UE 1115 may determine the first PDCP discard timer based on the uplink grant 1120, the downlink transmission 1125 (e.g., configuration information, control information), or both. For example, the base station 1105 may configure the UE 1115 (e.g., via the downlink transmission 1125) with the first PDCP discard timer based on the type of data traffic 1130 which is to be transmitted by the UE 1115, field logs, end-application QoS level requirements, sensitivities of data traffic 1130, or any combination thereof. For instance, the base station 1105 may configure the UE 1115 with the first PDCP discard timer as part of a PDCP configuration when a DRB is configured for uplink transmissions at the UE 1115. Additionally, or alternatively, the UE 1115 may be configured (e.g., preconfigured) with the first PDCP discard timer, such that the UE 1115 determines the first PDCP discard timer autonomously (e.g., without signaling from the base station 1105). In some cases, the UE 1115 may be configured with a first PDCP discard timer with a duration of 10 ms, 110 ms, 120 ms, 40 ms, 50 ms, 75 ms, 100 ms, 150 ms, 1100 ms, 1150 ms, 1200 ms, 500 ms, 750 ms, 150 ms, or a different duration.

In some aspects, the UE 1115 may identify data traffic 1130 that is to be transmitted. In some aspects, the UE 1115 may identify data traffic 1130 that is to be transmitted based on (e.g., according to) the uplink grant 1120, the downlink transmission 1125 (e.g., configuration information, control information), determining the first PDCP discard timer, or any combination thereof. For example, the UE 1115 may determine that the identified data traffic 1130 is to be transmitted according to the uplink grant 1120 and/or using the first PDCP discard timer. In some aspects, the UE 1115 may identify data traffic 1130 that is waiting to be transmitted within a buffer (e.g., Watermark) of the UE 1115. Accordingly, in some cases, the UE 1115 may identify the data traffic 1130 based on a BSR associated with the buffer of the UE 1115. Additionally, or alternatively, the UE 1115 may determine a data rate associated with the data traffic 1130. For example, the UE 1115 may determine a data rate at which uplink transmissions for the data traffic 1130 are to be transmitted. In this example, the data rate associated with the data traffic 1130 may be indicated to the UE 1115 via the downlink transmission 1125.

The UE 1115 may determine a set of conditions associated with the uplink grant 1120, the UE 1115 itself, or both. In particular, the set of conditions may be associated with a data rate (e.g., throughput) of the uplink grant 1120, a data rate of uplink transmissions including the data traffic 1130, or both. In this regard, the set of conditions associated with the data rate of the uplink grant, uplink transmissions, and/or data traffic 1130 may include conditions which may affect a data rate at which the UE 1115 may transmit uplink transmissions, including radio link conditions, operating conditions at the UE 1115, or any combination thereof. In some aspects, the UE 1115 may determine the set of conditions associated with the data rate of the uplink grant 1120 based on receiving the uplink grant 1120, receiving the downlink transmission 1125, determining the first PDCP discard timer, identifying the data traffic 1130, or any combination thereof.

In some aspects, the set of conditions may include a quantity of the data traffic 1130 in the buffer of the UE 1115, a data rate allocated for uplink transmissions at the UE 1115, a maximum data rate associated with the uplink grant 1120 allocated for the UE 1115, thermal levels and/or power levels at the UE 1115, or any combination thereof. For example, the UE 1115 may determine that a quantity of the data traffic 1130 which is to be transmitted according to the uplink grant 1120 is greater than or equal to a data traffic threshold. The UE 1115 may determine an indication of the quantity of the data traffic 1130 based on a BSR. In this example, the condition associated with the data rate of the uplink grant 1120 may include the quantity of data traffic 1130 exceeding the data traffic threshold (e.g., Condition=$Quantity_{DT} \geq Thresh_{DT}$). Such a condition may indicate or suggest that the data traffic 1130 may accumulate within the buffer at the UE 1115, which may result in dropped (e.g., discarded) data units if the first PDCP discard timer is used.

By way of another example, the UE 1115 may determine a data rate for uplink transmissions performed by the UE 1115 (e.g., a data rate associated with the identified data traffic 1130). The UE 1115 may determine the data rate for the uplink transmissions based on an indication received from the base station 1105 via the downlink transmission 1125. The UE 1115 may further determine a maximum data rate associated with the uplink grant 1120 received from the base station 1105. In this example, the UE 1115 may determine that the determined data rate for the uplink transmissions (e.g., determined data rate for transmitting the identified data traffic 1130) is greater than or equal to the maximum data rate associated with the uplink grant 1120. In this example, the condition associated with the data rate of the uplink grant 1120 may include the data rate of the uplink transmissions performed by the UE 1115 exceeding the maximum data rate of the uplink grant 1120 (e.g., Condition=$DataRate_{UL\ Transmissions} \geq MaxDataRate_{UL\ Grant}$). Such a condition may indicate or suggest that the data traffic 1130 may accumulate within the buffer at the UE 1115 faster than the data traffic 1130 may be transmitted according to the uplink grant 1120, which may result in dropped (e.g., discarded) data units if the first PDCP discard timer is used.

By way of another example, the UE 1115 may determine that a power level (e.g., power profile) for transmitting uplink transmissions at the UE 1115 is less than or equal to a threshold power level (e.g., threshold power profile). In this example, the condition associated with the data rate of the uplink grant 1120 may include the power level for transmitting the uplink transmissions being less than or equal to the threshold power level (e.g., Condition=$Power_{UL\ Transmissions} \leq Thresh_{power}$). Such a condition may indicate or suggest that the UE 1115 may be unable to transmit the data traffic 1130 at a given data rate and may thereby experience uplink data throttling leading to an accumulation of data traffic 1130 within the buffer at the UE 1115, which may result in dropped (e.g., discarded) data units if the first PDCP discard timer is used.

By way of another example, the UE 1115 may determine that a thermal level (e.g., thermal profile) of the UE 1115 is greater than or equal to a threshold thermal level (e.g., threshold thermal profile). In this example, the condition associated with the data rate of the uplink grant 1120 may include the thermal level for transmitting the uplink transmissions being greater than or equal to the threshold thermal level (e.g., Condition=$Thermal_{UE} \geq Thresh_{Thermal}$). Such a condition may indicate or suggest that the UE 1115 may be overheating or otherwise unable to transmit the data traffic 1130 at a given data rate and may thereby experience uplink data throttling leading to an accumulation of data traffic 1130 within the buffer at the UE 1115, which may result in dropped (e.g., discarded) data units if the first PDCP discard timer is used.

In some aspects, the UE 1115 may determine a set of parameters associated with the data traffic 1130. In some aspects, the UE 1115 may determine the set of parameters (e.g., set of characteristics) associated with the data traffic 1130 based on the set of conditions determined associated with the data rate of the uplink grant 1120, the data traffic 1130, or both. Additionally, or alternatively, the UE 1115 may determine the set of parameters associated with the data traffic 1130 based on receiving the uplink grant 1120, receiving the downlink transmission 1125 (e.g., configuration information, control information), determining the first PDCP discard timer, identifying the data traffic 1130 which is to be transmitted, or any combination thereof. In some aspects, the UE 1115 may determine the set of parameters associated with the data traffic 1130 such that the UE 1215 may use the set of parameters to determine whether or not the first PDCP discard timer should be selectively adjusted and/or replaced with a second PDCP discard timer.

In this regard, the set of parameters may include any parameters or characteristics associated with the identified data traffic 1130 including, but not limited to, bearers associated with the data traffic 1130, a type of bearer associated with the data traffic 1130 (e.g., SRB, DRB), a QoS metric associated with the data traffic 1130, a priority associated with the data traffic 1130, a delay sensitivity metric associated with the data traffic 1130, a reliability metric associated with the data traffic 1130, or any combination thereof. Such parameters and/or additional parameters may indicate if and/or how beneficial it may be for the UE 1115 to selectively adjust the first PDCP discard timer and/or replace the first PDCP discard timer.

For example, in cases where the data traffic 1130 is associated with a higher priority, a higher QoS metric, a higher delay sensitivity metric (e.g., the data traffic 1130 is highly susceptible to declining performance in the event of delays), a higher reliability metric (e.g., highly reliable communications are required for effective service), or any combination thereof, the UE 1115 may be more inclined to selectively adjust the first PDCP discard timer and/or select a second PDCP discard timer in order to reduce or eliminate a quantity or percentage of data units which are discarded or dropped in response to short, intermittent interruptions in wireless communications. Conversely, in cases where the data traffic 1130 is associated with a lower priority, a lower QoS metric, a lower delay sensitivity metric (e.g., the data traffic 1130 is not as susceptible to declining performance in the event of delays), a lower reliability metric (e.g., ultra-reliable communications are not as required for effective service), or any combination thereof, the UE 1115 may be more less inclined to selectively adjust the first PDCP discard timer and/or select a second PDCP discard timer, as the data traffic 1130 at issue may be less susceptible to discarded and/or dropped packets as a result of short, intermittent interruptions in wireless communications.

In some cases, the UE 1115 may receive an indication of the set of parameters associated with the data traffic from an application or program (e.g., FaceTime) executed by the UE 1115. In this regard, an application, service, or program executed by the UE 1115 and with which the data traffic 1130 is associated may inform the UE 1115 as to one or more parameters (e.g., characteristics) associated with the data traffic 1130. Applications, services, or programs executed by the UE 1115 may include video messaging applications, gaming applications, internet browsing applications, and the like. For example, the UE 1115 may identify video messaging data traffic 1130 associated with a video messaging application (e.g., FaceTime) executed by the UE 1115. In this example, the video messaging application may transmit, to one or more components of the UE 1115 (e.g., a modem, processors, or other components of the UE 1115), an indication of a set of parameters associated with the data traffic 1130. For instance, in the context of video messaging data traffic 1130, the video messaging application may transmit, to one or more components of the UE 1115, an indication that the video messaging data traffic 1130 is associated with a high delay sensitivity metric and a high QoS metric.

In some aspects, the UE 1115 may determine a second PDCP discard timer which is different from the first PDCP discard timer based on the set of parameters associated with the data traffic 1130. For example, in cases where the UE 1115 determines that the data traffic 1130 is highly susceptible to declining quality in the case of dropped or discarded data units (e.g., dropped/discarded packets, PDUs, SDUs) based on the set of parameters, the UE 1115 may determine the second PDCP discard timer in order to reduce and/or eliminate dropped data units. Additionally, or alternatively, the UE 1115 may determine the second PDCP discard timer based on receiving the uplink grant 1120, receiving the downlink transmission 1125 (e.g., configuration information, control information), determining the first PDCP discard timer, identifying the data traffic 1130 that is to be transmitted, determining the set of conditions associated with a data rate of the uplink grant 1120 and/or data traffic 1130, or any combination thereof.

In some aspects, the UE 1115 may determine the second PDCP discard timer by selecting a new PDCP discard timer (e.g., second PDCP discard timer) different from the first PDCP discard timer, selectively modifying the first PDCP discard timer to generate the second PDCP discard timer, or both. For example, in some cases, the UE 1115 may selectively adjust (e.g., lengthen, extend) the first PDCP discard timer to generate the second PDCP discard timer such that a first duration of the first PDCP discard timer is less than a second duration of the second PDCP discard timer (e.g., $\text{Duration}_{PDCP1} < \text{Duration}_{PDCP2}$). For instance, the first PDCP discard timer may include a duration of 500 ms, and the second PDCP discard timer may include a duration of 1000 ms. In this example, by selecting a new PDCP discard timer and/or selectively modifying the first PDCP discard timer such that the second PDCP discard timer is longer than the first PDCP discard timer, data units (e.g., packets, PDUs, SDUs) may be allowed a longer time between arriving at the buffer and being transmitted before being dropped/discarded, which may thereby decrease a quantity/percentage of dropped data units.

Upon determining the second PDCP discard timer, the UE 1115 may transmit the data traffic 1130 to the base station 1105 using the second PDCP discard timer. For example, the UE 1115 may transmit the data traffic 1130-*a* to the base station 1105 using (e.g., according to, based on) the second PDCP discard timer. The UE 1115 may transmit the data traffic 1130-*a* to the base station 1105 according to the uplink grant 1120, by using the second PDCP discard timer, or both. In this regard, the UE 1115 may transmit the data traffic 1130-*a* based on receiving the uplink grant 1120, determining the second PDCP discard timer, or both. Additionally, or alternatively, the UE 1115 may transmit the data traffic 1130-*a* based on receiving the downlink transmission 1125 (e.g., configuration information, control information), determining the first PDCP discard timer, identifying the data traffic 1130 that is to be transmitted, determining the set of conditions associated with a data rate of the uplink grant 1120 and/or data traffic 1130, determining the set of parameters associated with the data traffic 1130, or any combination thereof.

As noted previously herein, the UE 1115 may be configured to transmit the data traffic 1130-*a* based on (e.g., according to, using) the second PDCP discard timer by refraining from transmitting data units (e.g., packets, PDUs, SDUs) of the data traffic 1130-*a* based on the second PDCP discard timer. For example, the UE 1115 may determine reception times at which each of the data units of the data traffic 1130-*a* are received at a buffer of the UE 1115. In this example, the UE 1115 may determine buffer durations associated with each of the data units of the data traffic 1130-*a* based on the reception times. The term "buffer durations" may be used herein to refer to durations of time that each data unit spends in the buffer before being transmitted. Accordingly, a buffer duration of a data unit may be defined as the duration of time between the time at which the data unit arrives at the buffer and the time that the data unit is transmitted by the UE 1115. Continuing with the same example, upon determining buffer durations for the respective data units, the UE 1115 may discard (e.g., drop, or otherwise refrain from transmitting) data units which include buffer durations which are greater than or equal to a duration of the second PDCP discard timer (e.g., discard data unit if buffer duration of data unit is greater than or equal to a duration of the second PDCP discard timer).

In some aspects, the UE 1115 may transmit the data traffic 1130-*a* by applying the second PDCP discard timer to one or more bearers and/or type of bearers associated with the data traffic. For example, as noted previously herein, the UE 1115 may determine one or more bearers associated with the data traffic 1130-*a*. In this example, the UE 1115 may transmit the data traffic 1130-*a* by applying the second PDCP discard timer to the one or more bearers of the data traffic 1130-*a*. In this regard, the UE 1115 may discard or drop data units which are transmitted via the one or more determined bearers according to the second PDCP discard timer, as discussed previously herein.

In some aspects, the UE 1115 may determine an expiration of a validity period associated with the second PDCP discard timer. The validity period associated with the second PDCP discard timer may refer to a duration of time in which the PDCP discard timer is used to transmit data traffic 1130-*a*. In this regard, the UE 1115 may initiate the validity period based on beginning to transmit the data traffic 1130-*a* using the second PDCP discard timer, and may transmit the data traffic 1130-*a* based on the second PDCP discard timer until the expiration of the validity period. In some aspects, the UE 1115 may determine the validity period associated with the second PDCP discard timer based on determining the second PDCP discard timer. Additionally, or alternatively, the UE 1115 may determine the validity period associated with the second PDCP discard timer based on receiving the uplink grant 1120, receiving the downlink transmission 1125 (e.g., configuration information, control information), determining the first PDCP discard timer, identifying the data traffic 1130 that is to be transmitted, determining the set of conditions associated with a data rate of the uplink grant 1120 and/or data traffic 1130, determining the set of parameters associated with the data traffic 1130, or any combination thereof.

Upon determining the expiration of the validity period associated with second PDCP discard timer, the UE 1115 may transmit data traffic 1130-*b* using the first PDCP discard timer. In some aspects, the UE 1215 may transmit the data traffic 1130-*b* using the first PDCP discard timer based on determining the expiration of the validity period associated with the second PDCP discard timer. Additionally, or alternatively, the UE 1115 may transmit the data traffic 1130-*b* using a third PDCP discard timer which is different from the first PDCP discard timer and/or the second PDCP discard timer upon an expiration of the validity period associated with the second PDCP discard timer.

Techniques described herein may support dynamic adjustment of PDCP discard timers. In particular, techniques described herein may enable the UE 1115 to selectively adjust PDCP discard timers (or select new PDCP discard timers) in order to reduce or eliminate a quantity of data units which are discarded in response to short, intermittent interruptions to wireless communications. By enabling the dynamic adjustment of PDCP discard timers, techniques described herein may improve the quality and efficiency of wireless communications within the wireless communications system 1100, and may improve overall user experience.

Figure 12:
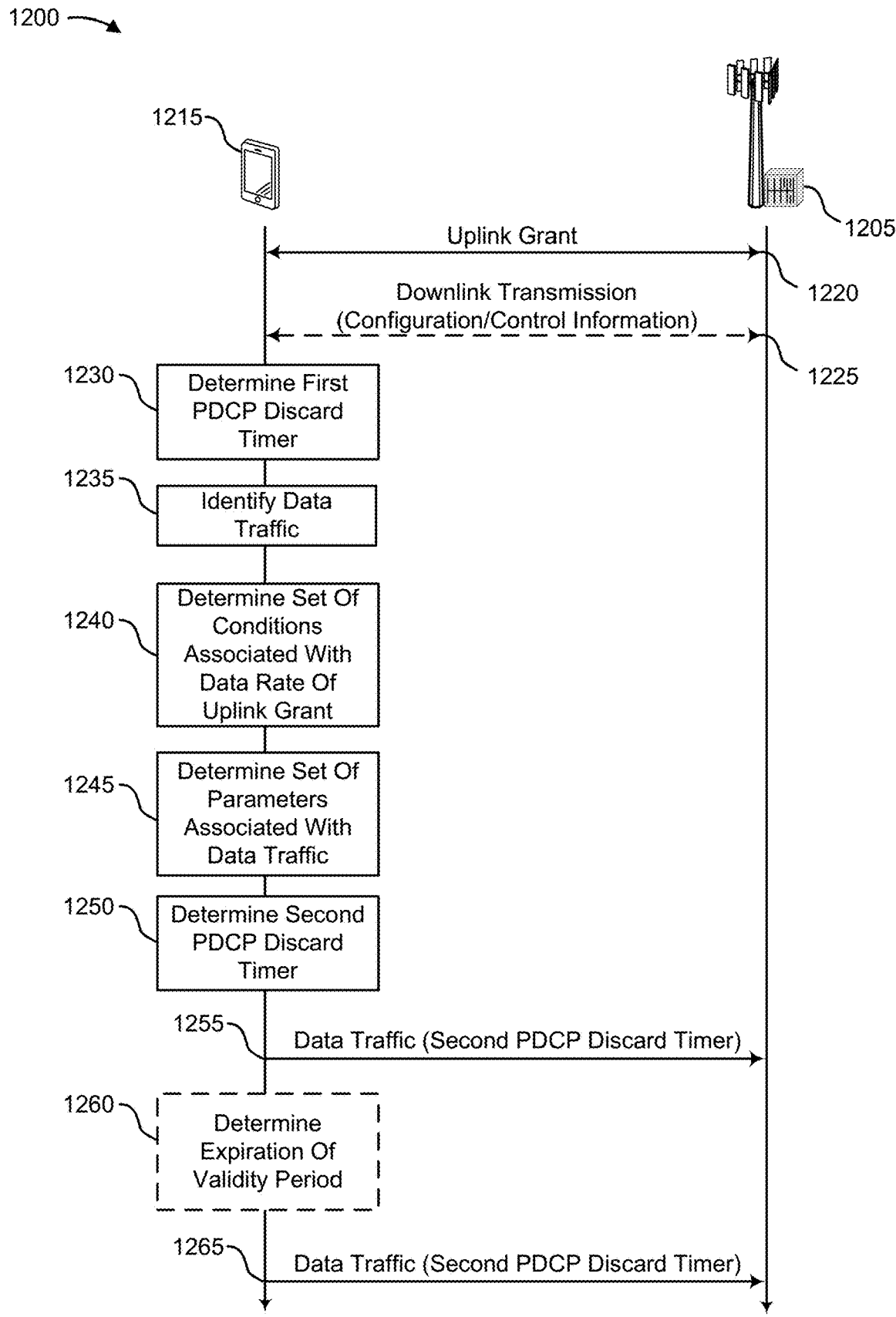
FIG. 12 illustrates an example of a process flow that supports techniques for dynamic PDCP timer adjustment, in accordance with the present disclosure.

FIG. 12 illustrates an example of a process flow 1200 that supports techniques for dynamic PDCP timer adjustment in accordance with the present disclosure. In some examples, process flow 1200 may implement, or be implemented by, aspects of wireless network 100, wireless communications system 1100, or both. The process flow 1200 may illustrate determining a first PDCP discard timer, determining a set of conditions associated with a data rate of an uplink grant, determining a set of parameters associated with identified data traffic, determining a second PDCP discard timer, and transmitting the data traffic using the second PDCP discard timer, as described with reference to FIGS. 1-11, among other aspects.

In some aspects, process flow 1200 may include a UE 1215 and a base station 1105 which may be examples of corresponding devices as described herein. The UE 1215 illustrated in FIG. 12 may be an example of the UE 1115 illustrated in FIG. 11. Similarly, the base station 1205 illustrated in FIG. 12 may be an example of the base station 1105 illustrated in FIG. 11.

In some aspects, the operations illustrated in process flow 1200 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 1220, the base station 1205 may transmit, to the UE 1215, an uplink grant which is to be used by the UE 1215 to transmit uplink transmissions. The uplink grant may include a set of time resources, a set of frequency resources, a set of spatial resources, or any combination thereof. In some aspects, the uplink grant may be associated with a given set of data traffic at the UE 1215, a given type of data traffic at the UE 1215, or both. In some aspects, the UE 1215 may be configured to determine a maximum data rate (e.g., maximum throughput) associated with the uplink grant.

At 1225, the base station 1205 may transmit a downlink transmission to the UE 1215, where the downlink transmission includes control information, configuration information, or both. For example, the downlink transmission may include an indication of a first PDCP discard timer which is to be used by the UE 1215 when transmitting uplink transmissions. By way of another example, the downlink transmission may include an indication of a data rate for uplink transmissions to be performed by the UE 1215. For instance, the indication of the data rate within the downlink transmission may be associated with a given type of data traffic (e.g., video messaging data traffic) which is to be transmitted by the UE 1215. The downlink transmission may include an RRC message, a configuration message, or both. In some aspects, the information indicated via the downlink transmission may be associated with uplink transmissions performed according to the uplink grant received at 1220. In this regard, the base station 1205 may transmit the downlink transmission at 1225 based on transmitting the uplink grant at 1220.

At 1230, the UE 1215 may determine a first PDCP discard timer. In some aspects, the UE 1215 may determine the first PDCP discard timer based on the uplink grant received at 1220, the downlink transmission (e.g., configuration information, control information) received 1225, or both. For example, the base station 1205 may configure the UE 1215 (e.g., via the downlink transmission at 1225) with the first PDCP discard timer based on the type of data which is to be transmitted by the UE 1215, field logs, end-application QoS level requirements, sensitivities of data traffic, or any combination thereof. In some aspects, the base station 1205 may configure the UE 1215 with the first PDCP discard timer as part of a PDCP configuration. Additionally, or alternatively, the UE 1215 may determine the first PDCP discard timer autonomously (e.g., without signaling from the base station 1205).

At 1235, the UE 1215 may identify data traffic that is to be transmitted. In some aspects, the UE 1215 may identify data traffic that is to be transmitted based on (e.g., according to) the uplink grant received at 1220, the downlink transmission (e.g., configuration information, control information) received at 1225, determining the first PDCP discard timer at 1230, or any combination thereof. For example, the UE 1215 may determine that the identified data traffic is to be transmitted according to the uplink grant and/or using the first PDCP discard timer. In some aspects, the UE 1215 may identify data traffic that is waiting to be transmitted within a buffer (e.g., Watermark) of the UE 1215. Accordingly, in some cases, the UE 1215 may identify the data traffic at 1235 based a BSR. Additionally, or alternatively, the UE 1215 may determine a data rate associated with the data traffic. For example, the UE 1215 may determine a data rate at which uplink transmissions for the data traffic are to be transmitted. In this example, the data rate associated with the data traffic may be indicated to the UE 1215 via the downlink transmission received at 1225.

At 1240, the UE 1215 may determine a set of conditions associated with the uplink grant, the UE 1215 itself, or both. In particular, the set of conditions may be associated with a data rate (e.g., throughput) of the uplink grant. In this regard, the set of conditions associated with the data rate of the uplink grant may include conditions which may affect a data rate at which the UE 1215 may transmit uplink transmissions, including radio link conditions, operating conditions at the UE 1215, or any combination thereof. In some aspects, the UE 1215 may determine the set of conditions associated with the data rate of the uplink grant based on receiving the uplink grant at 1220, receiving the downlink transmission at 1225, determining the first PDCP discard timer at 1230, identifying the data traffic at 1235, or any combination thereof.

In some aspects, the set of conditions may include a quantity of the data traffic in the buffer of the UE 1215, a data rate allocated for uplink transmissions at the UE 1215, a maximum data rate associated with the uplink grant allocated for the UE 1215, thermal levels and/or power levels at the UE 1215, or any combination thereof. For example, the UE 1215 may determine that a quantity of the data traffic identified at 1235 which is to be transmitted according to the uplink grant is greater than or equal to a data traffic threshold. The UE 1215 may determine an indication of the quantity of the data traffic based on a BSR. In this example, the condition associated with the data rate of the uplink grant may include the quantity of data traffic exceeding the data traffic threshold (e.g., Condition=Quantity$_{DT}$≥Thresh$_{DT}$). Such a condition may indicate or suggest that the data traffic may accumulate within the buffer at the UE 1215, which may result in dropped (e.g., discarded) data units if the first PDCP discard timer is used.

At 1245, the UE 1215 may determine a set of parameters associated with the data traffic. In some aspects, the UE 1215 may determine the set of parameters (e.g., set of characteristics) associated with the data traffic based on the set of conditions determined at 1240. Additionally, or alternatively, the UE 1215 may determine the set of parameters associated with the data traffic based on receiving the uplink grant at 1220, receiving the downlink transmission (e.g., configuration information, control information) at 1225, determining the first PDCP discard timer at 1230, identifying the data traffic at 1235, or any combination thereof. Moreover, in some cases, the UE 1215 may receive an indication of the set of parameters from an application or program (e.g., FaceTime) executed by the UE 1215. In some aspects, the UE 1215 may determine the set of parameters associated with the data traffic such that the UE 1215 may use the set of parameters to determine whether or not the first PDCP discard timer should be selectively adjusted and/or replaced with a second PDCP discard timer.

In this regard, the set of parameters may include any parameters or characteristics associated with the identified data traffic including, but not limited to, bearers associated with the data traffic, a type of bearer associated with the data traffic (e.g., SRB, DRB), a QoS metric associated with the data traffic, a priority associated with the data traffic, a delay sensitivity metric associated with the data traffic, a reliability metric associated with the data traffic, or any combination thereof. Such parameters and/or additional parameters may indicate if and/or how beneficial it may be for the UE 1215 to selectively adjust the first PDCP discard timer and/or replace the first PDCP discard timer.

For example, in cases where the data traffic is associated with a higher priority, a higher QoS metric, a higher delay sensitivity metric (e.g., the data traffic is highly susceptible to declining performance in the event of delays), a higher reliability metric (e.g., highly reliable communications are required for effective service), or any combination thereof, the UE 1215 may be more inclined to selectively adjust the first PDCP discard timer and/or select a second PDCP discard timer in order to reduce or eliminate a quantity or percentage of data units which are discarded or dropped in response to short, intermittent interruptions in wireless communications. Conversely, in cases where the data traffic is associated with a lower priority, a lower QoS metric, a lower delay sensitivity metric (e.g., the data traffic is not as susceptible to declining performance in the event of delays), a lower reliability metric (e.g., ultra-reliable communications are not as required for effective service), or any combination thereof, the UE 1215 may be more less inclined to selectively adjust the first PDCP discard timer and/or select a second PDCP discard timer, as the data traffic at issue may be less susceptible to discarded and/or dropped packets as a result of short, intermittent interruptions in wireless communications.

In some aspects, an application, service, or program executed by the UE 1215 and with which the data traffic is associated may inform the UE 1215 as to one or more parameters (e.g., characteristics) associated with the data traffic. Applications, services, or programs executed by the UE 1215 may include video messaging applications, gaming applications, internet browsing applications, and the like. For example, at 1235, the UE 1215 may identify video messaging traffic associated with a video messaging application (e.g., FaceTime) executed by the UE 1215. In this example, the video messaging application may transmit, to one or more components of the UE 1215 (e.g., a modem, processors, or other components of the UE 1215), an indication of a set of parameters associated with the data traffic. For instance, in the context of video messaging data traffic, the video messaging application may transmit, to one or more components of the UE 1215, an indication that the video messaging data traffic is associated with a high delay sensitivity metric and a high QoS metric.

At 1250, the UE 1215 may determine a second PDCP discard timer which is different from the first PDCP discard timer. In some aspects, the UE 1215 may determine the second PDCP discard timer based on the set of parameters associated with the data traffic determined at 1245. For example, in cases where the UE 1215 determines that the data traffic is highly susceptible to declining quality in the case of dropped or discarded data units (e.g., dropped/discarded packets, PDUs, SDUs) based on the set of parameters, the UE 1215 may determine the second PDCP discard timer at 1250 in order to reduce and/or eliminate dropped data units. Additionally, or alternatively, the UE 1215 may determine the second PDCP discard timer based on receiving the uplink grant at 1220, receiving the downlink transmission (e.g., configuration information, control information) at 1225, determining the first PDCP discard timer at 1230, identifying the data traffic at 1235, determining the set of conditions associated with a data rate at 1240, or any combination thereof.

In some aspects, the UE 1215 may determine the second PDCP discard timer by selecting a new PDCP discard timer (e.g., second PDCP discard timer) different from the first PDCP discard timer, selectively modifying the first PDCP discard timer to generate the second PDCP discard timer, or both. For example, in some cases, the UE 1215 may selectively adjust (e.g., lengthen, extend) the first PDCP discard timer to generate the second PDCP discard timer such that a first duration of the first PDCP discard timer is less than a second duration of the second PDCP discard timer (e.g., $\text{Duration}_{PDCP1} < \text{Duration}_{PDCP2}$). For instance, the first PDCP discard timer may include a duration of 500 ms, and the second PDCP discard timer may include a duration of 1000 ms. In this example, by selecting a new PDCP discard timer and/or selectively modifying the first PDCP discard timer such that the second PDCP discard timer is longer than the first PDCP discard timer, data units (e.g., packets, PDUs, SDUs) may be allowed a longer time between arriving at the buffer and being transmitted before being dropped/discarded, which may thereby decrease a quantity/percentage of dropped data units.

At 1255, the UE 1215 may transmit the data traffic to the base station 1205. The UE 1215 may transmit the data traffic to the base station 1205 according to the uplink grant, by using the second PDCP discard timer, or both. In this regard, the UE 1215 may transmit the data traffic at 1255 based on receiving the uplink grant at 1220, determining the second PDCP discard timer at 1250, or both. Additionally, or alternatively, the UE 1215 may transmit the data traffic at 1255 based on receiving the downlink transmission (e.g., configuration information, control information) at 1225, determining the first PDCP discard timer at 1230, identifying the data traffic at 1235, determining the set of conditions associated with a data rate at 1240, determining the set of parameters associated with the data traffic at 1245, or any combination thereof.

As noted previously herein, the UE 1215 may be configured to transmit the data traffic based on (e.g., according to, using) the second PDCP discard timer by refraining from transmitting data units (e.g., packets, PDUs, SDUs) of the data traffic based on the second PDCP discard timer. For example, the UE 1215 may determine reception times at which each of the data units of the data traffic are received at a buffer of the UE 1215. In this example, the UE 1215 may determine buffer durations associated with each of the data units of the data traffic based on the reception times. Upon determining buffer durations for the respective data units, the UE 1215 may discard (e.g., drop, or otherwise refrain from transmitting) data units which include buffer durations which are greater than or equal to a duration of the second PDCP discard timer (e.g., discard data unit if buffer duration of data unit is greater than or equal to a duration of the second PDCP discard timer).

In some aspects, the UE 1215 may transmit the data traffic at 1255 by applying the second PDCP discard timer to one or more bearers and/or type of bearers associated with the data traffic. For example, as noted previously herein, the UE 1215 may determine one or more bearers associated with the data traffic at 1245. In this example, the UE 1215 may transmit the data traffic at 1255 by applying the second PDCP discard timer to the one or more bearers of the data traffic. In this regard, the UE 1215 may discard or drop data units which are transmitted via the one or more determined bearers according to the second PDCP discard timer, as discussed previously herein.

At 1260, the UE 1215 may determine an expiration of a validity period associated with the second PDCP discard timer. The validity period associated with the second PDCP discard timer may refer to a duration of time in which the PDCP discard timer is used to transmit data traffic. In this regard, the UE 1215 may initiate the validity period based on beginning to transmit the data traffic using the second PDCP discard timer, and may transmit the data traffic based on the second PDCP discard timer until the expiration of the validity period. In some aspects, the UE 1215 may determine the validity period associated with the second PDCP discard timer based on determining the second PDCP discard timer at 1250. Additionally, or alternatively, the UE 1215 may determine the validity period associated with the second PDCP discard timer based on receiving the uplink grant at 1220, receiving the downlink transmission (e.g., configuration information, control information) at 1225, determining the first PDCP discard timer at 1230, identifying the data traffic at 1235, determining the set of conditions associated with a data rate at 1240, determining the set of parameters associated with the data traffic at 1245, or any combination thereof.

At 1265, the UE 1215 may transmit the data traffic using the first PDCP discard timer. In some aspects, the UE 1215 may transmit the data traffic using the first PDCP discard timer at 1265 based on determining the expiration of the validity period associated with the second PDCP discard timer at 1260.

Techniques described herein may support dynamic adjustment of PDCP discard timers. In particular, techniques described herein may enable the UE 1215 to selectively adjust PDCP discard timers (or select new PDCP discard timers) in order to reduce or eliminate a quantity of data units which are discarded in response to short, intermittent interruptions to wireless communications. By enabling the dynamic adjustment of PDCP discard timers, techniques described herein may improve the quality and efficiency of wireless communications within a wireless communications system (e.g., wireless network 100, wireless communications system 1100), and may improve overall user experience.

Figure 13:
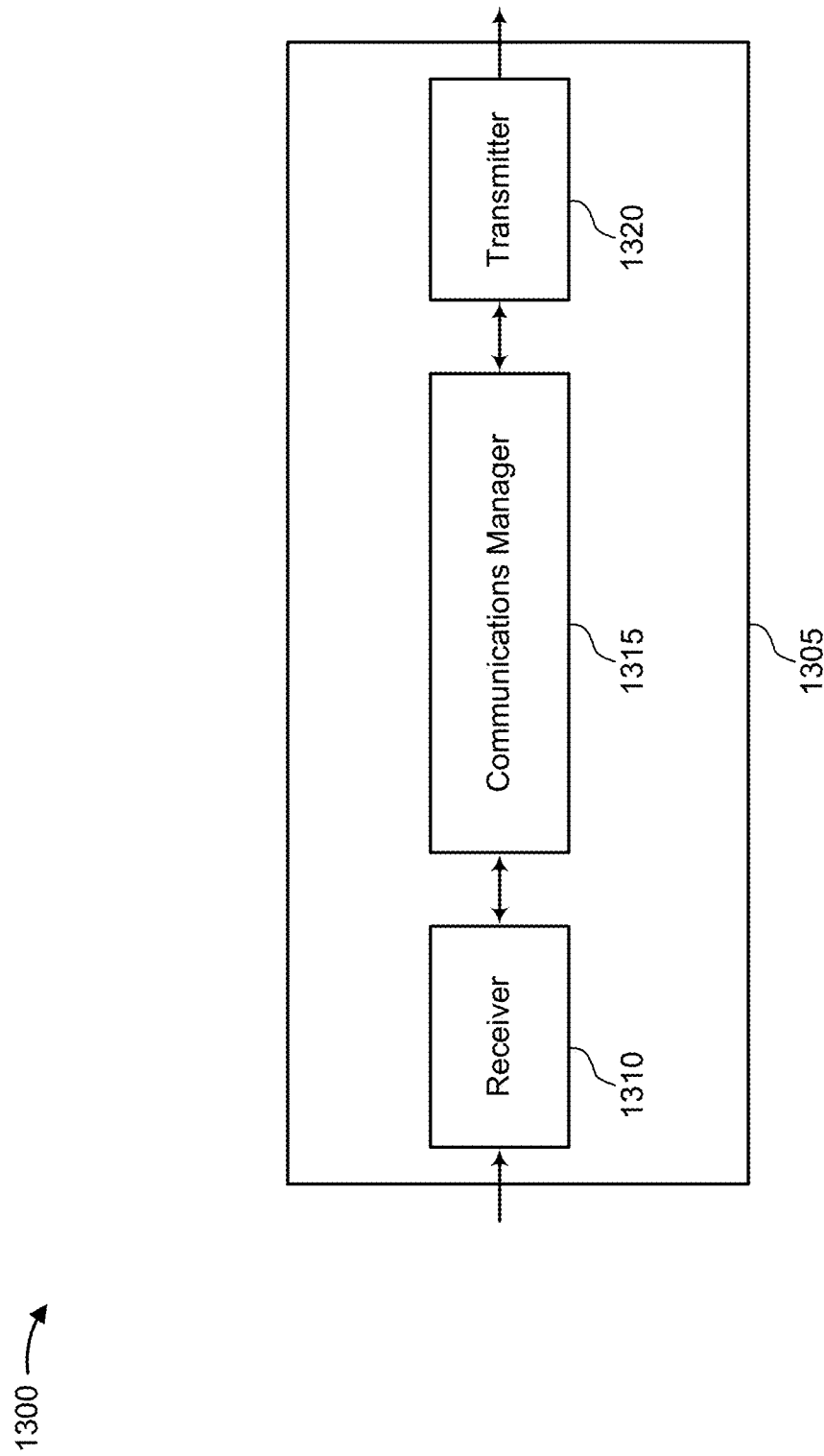
FIG. 13 shows a block diagram of a device that supports techniques for dynamic PDCP timer adjustment, in accordance with the present disclosure.

FIG. 13 shows a block diagram 1300 of a device 1305 that supports techniques for dynamic PDCP timer adjustment in accordance with the present disclosure. The device 1305 may be an example of aspects of a UE 120 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for dynamic PDCP timer adjustment, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may identify data traffic that is to be transmitted according to an uplink grant, the data traffic associated with a first PDCP discard timer, determine a set of parameters associated with the data traffic based on the determined set of conditions, determine a set of conditions associated with the uplink grant, the UE, or both, the set of conditions associated with a data rate of the uplink grant, determine a second PDCP discard timer different from the first PDCP discard timer based on the determined set of parameters, and transmit the data traffic according to the uplink grant using the second PDCP discard timer. The communications manager 1315 may be an example of aspects of the communications manager 1610 described herein.

The actions performed by the communications manager 1315 as described herein may be implemented to realize one or more potential advantages. For example, by enabling dynamic adjustment of PDCP discard timers, the communications manager 1315 may eliminate or reduce a quantity of data units which are discarded or dropped due to short, intermittent interruptions in wireless communications. This may lead to more reliable wireless communications and an overall improved user experience. Moreover, by reducing dropped data units and improving the reliability of wireless communications, a quantity of retransmissions within a wireless communications system (e.g., wireless network 100) may be reduced, thereby reducing overall traffic and signaling overhead.

Based on dynamically adjusting PDCP discard timers, a processor of the UE 120 (e.g., a processor controlling the receiver 1310, the communications manager 1315, the transmitter 1320, etc.) may reduce processing resources used for uplink communications. For example, by reducing or eliminating a quantity of discarded data units, the communications manager 1315 may reduce a quantity and/or frequency of uplink retransmissions which may be performed, which may correspondingly reduce a number of times the processor ramps up processing power and turns on processing units to handle uplink transmission.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
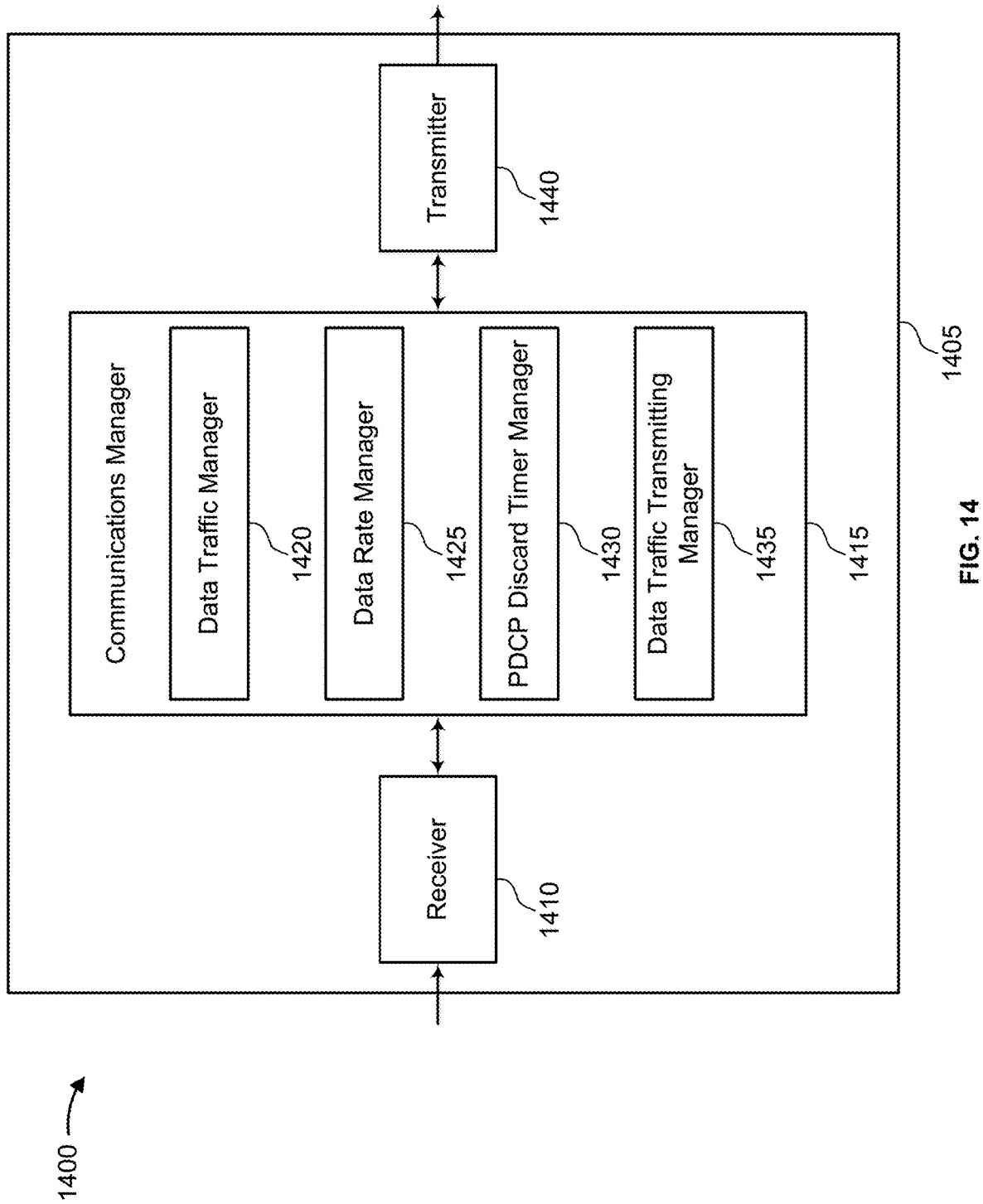
FIG. 14 shows a block diagram of a device that supports techniques for dynamic PDCP timer adjustment, in accordance with the present disclosure.

FIG. 14 shows a block diagram 1400 of a device 1405 that supports techniques for dynamic PDCP timer adjustment in accordance with the present disclosure. The device 1405 may be an example of aspects of a device 1305, or a UE 120 as described herein. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to techniques for dynamic PDCP timer adjustment, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a data traffic manager 1420, a data rate manager 1425, a PDCP discard timer manager 1430, and a data traffic transmitting manager 1435. The communications manager 1415 may be an example of aspects of the communications manager 1610 described herein.

The data traffic manager 1420 may identify data traffic that is to be transmitted according to an uplink grant, the data traffic associated with a first PDCP discard timer and determine a set of parameters associated with the data traffic based on the determined set of conditions.

The data rate manager 1425 may determine a set of conditions associated with the uplink grant, the UE, or both, the set of conditions associated with a data rate of the uplink grant.

The PDCP discard timer manager 1430 may determine a second PDCP discard timer different from the first PDCP discard timer based on the determined set of parameters.

The data traffic transmitting manager 1435 may transmit the data traffic according to the uplink grant using the second PDCP discard timer.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
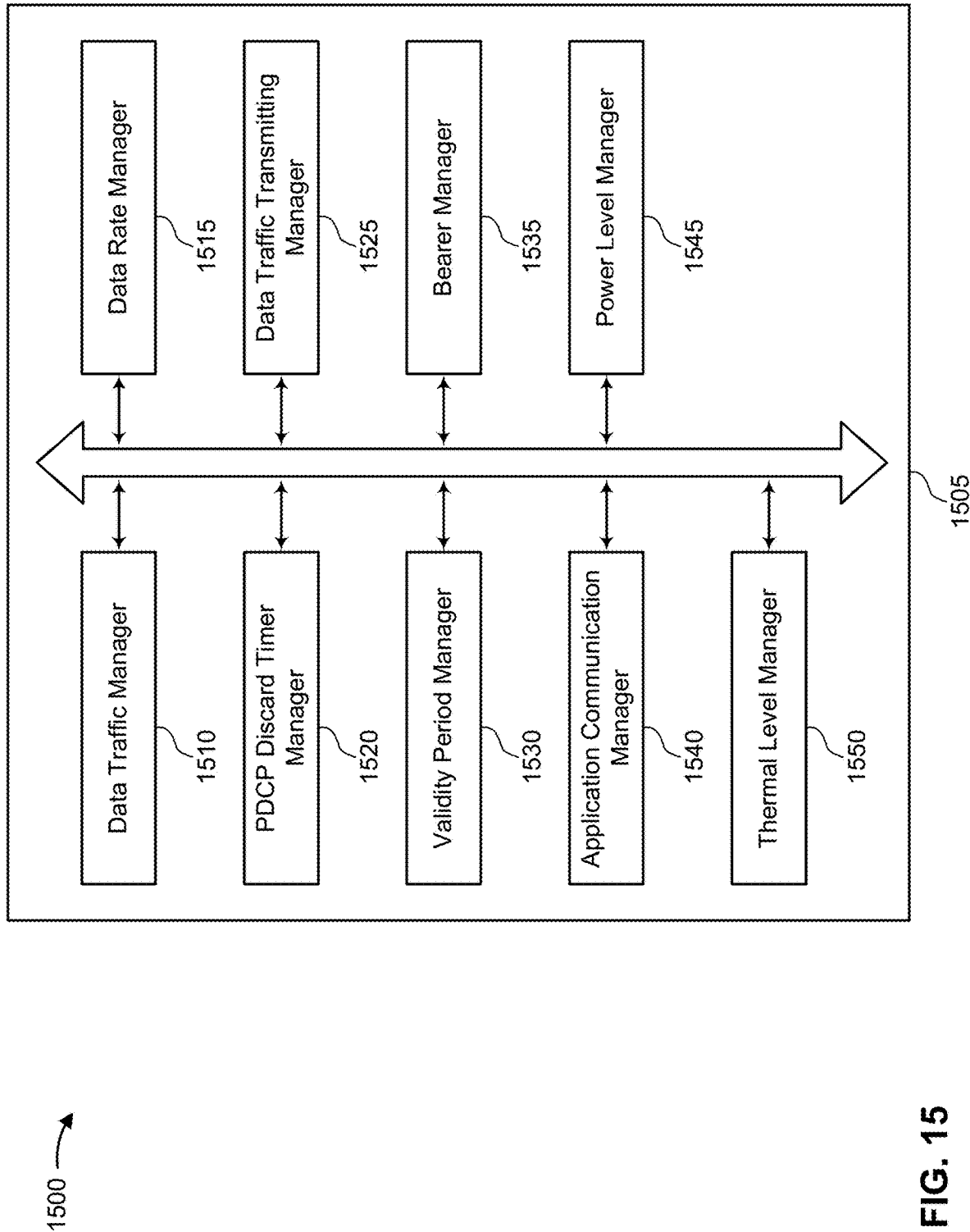
FIG. 15 shows a block diagram of a communications manager that supports techniques for dynamic PDCP timer adjustment, in accordance with the present disclosure.

FIG. 15 shows a block diagram 1500 of a communications manager 1505 that supports techniques for dynamic PDCP timer adjustment in accordance with the present disclosure. The communications manager 1505 may be an example of aspects of a communications manager 1315, a communications manager 1415, or a communications manager 1610 described herein. The communications manager 1505 may include a data traffic manager 1510, a data rate manager 1515, a PDCP discard timer manager 1520, a data traffic transmitting manager 1525, a validity period manager 1530, a bearer manager 1535, an application communication manager 1540, a power level manager 1545, and a thermal level manager 1550. Each of these modules may communicate, directly or indirectly, with one another (e.g., via one or more buses).

The data traffic manager 1510 may identify data traffic that is to be transmitted according to an uplink grant, the data traffic associated with a first PDCP discard timer. In some examples, the data traffic manager 1510 may determine a set of parameters associated with the data traffic based on the determined set of conditions. In some examples, the data traffic manager 1510 may determine a type of bearer associated with the data traffic, a quality of service metric associated with the data traffic, a priority associated with the data traffic, delay sensitivity metric associated with the data traffic, a reliability metric associated with the data traffic, or any combination thereof, where determining the second PDCP discard timer is based on the type of bearer, the quality of service metric, the delay sensitivity metric, the reliability metric, or any combination thereof. In some examples, the data traffic manager 1510 may determine that a quantity of the data traffic that is to be transmitted according to the uplink grant is greater than or equal to a data traffic threshold, where determining the set of conditions is based on determining the quantity of the data traffic is greater than or equal to the data traffic threshold. In some examples, the data traffic manager 1510 may determine an indication of the quantity of data traffic based on a BSR, where determining the quantity of data traffic is greater than or equal to the data traffic threshold is based on the BSR.

The data rate manager 1515 may determine a set of conditions associated with the uplink grant, the UE, or both, the set of conditions associated with a data rate of the uplink grant. In some examples, the data rate manager 1515 may receive, from a base station, an indication of a data rate for uplink transmissions performed by the UE. In some examples, the data rate manager 1515 may determine that the data rate for the uplink transmissions is greater than or equal to a maximum data rate associated with the uplink grant, where determining the set of conditions is based on determining the data rate for the uplink transmissions is greater than or equal to the maximum data rate associated with the uplink grant.

The PDCP discard timer manager 1520 may determine a second PDCP discard timer different from the first PDCP discard timer based on the determined set of parameters. In some examples, the PDCP discard timer manager 1520 may selectively adjust the first PDCP discard timer to generate the second PDCP discard timer, where determining the second PDCP discard timer is based on selectively adjusting the first PDCP discard timer. In some cases, a first duration of the first PDCP discard timer is less than a second duration of the second PDCP discard timer.

The data traffic transmitting manager 1525 may transmit the data traffic according to the uplink grant using the second PDCP discard timer. In some examples, the data traffic transmitting manager 1525 may transmit the data traffic using the first PDCP discard timer based on the expiration of the validity period. In some examples, the data traffic transmitting manager 1525 may refrain from transmitting data units of the data traffic based on the second PDCP discard timer. In some examples, the data traffic transmitting manager 1525 may determine reception times at which each of the data units of the data traffic are received at a buffer of the UE. In some examples, the data traffic transmitting manager 1525 may determine buffer durations associated with each of the data units of the data traffic based on the reception times. In some examples, the data traffic transmitting manager 1525 may discard data units which include buffer durations which are greater than or equal to a duration of the second PDCP discard timer.

The validity period manager 1530 may determine an expiration of a validity period associated with the second PDCP discard timer.

The bearer manager 1535 may determine one or more bearers associated with the data traffic, where the data traffic is transmitted according to the uplink grant based on applying the second PDCP discard timer to the one or more bearers associated with the data traffic.

The application communication manager 1540 may receive, from an application or program executed by the UE, an indication of the set of parameters associated with the data traffic, where determining the set of parameters associated with the data traffic is based on receiving the indication.

The power level manager 1545 may determine that a power level for transmitting uplink transmissions is less than or equal to a threshold power level, where determining the set of conditions is based on determining the power level is less than or equal to the threshold power level.

The thermal level manager 1550 may determine that a thermal level of the UE is greater than a threshold thermal level, where determining the set of conditions is based on determining the thermal level is greater than the threshold thermal level.

Figure 16:
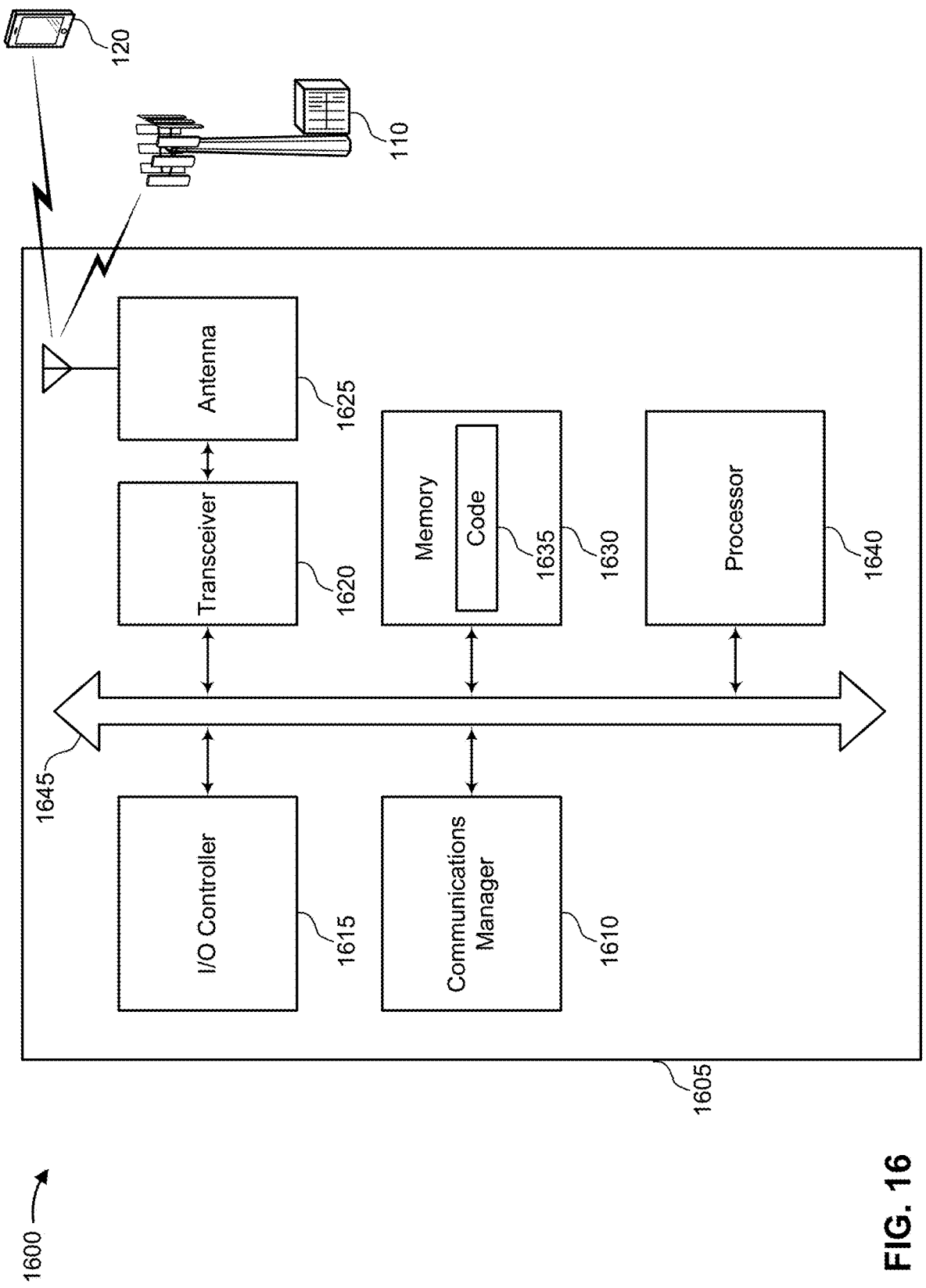
FIG. 16 shows a diagram of a system including a device that supports techniques for dynamic PDCP timer adjustment, in accordance with the present disclosure.

FIG. 16 shows a diagram of a system 1600 including a device 1605 that supports techniques for dynamic PDCP timer adjustment in accordance with the present disclosure. The device 1605 may be an example of or include the components of device 1305, device 1405, or a UE 120 as described herein. The device 1605 may include components for bi-directional voice and data communications including components for transmitting and receiving communications, including a communications manager 1610, an I/O controller 1615, a transceiver 1620, an antenna 1625, memory 1630, and a processor 1640. These components may be in electronic communication via one or more buses (e.g., bus 1645).

The communications manager 1610 may identify data traffic that is to be transmitted according to an uplink grant, the data traffic associated with a first PDCP discard timer, determine a set of parameters associated with the data traffic based on the determined set of conditions, determine a set of conditions associated with the uplink grant, the UE, or both, the set of conditions associated with a data rate of the uplink grant, determine a second PDCP discard timer different from the first PDCP discard timer based on the determined set of parameters, and transmit the data traffic according to the uplink grant using the second PDCP discard timer.

The I/O controller 1615 may manage input and output signals for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include random-access memory (RAM) and read-only memory (ROM). The memory 1630 may store computer-readable, computer-executable code 1635 including instructions that, when executed, cause the processor to perform various functions described herein. In some cases, the memory 1630 may contain, among other things, a basic I/O system (BIOS) which may control basic hardware or software operation such as the interaction with peripheral components or devices.

The processor 1640 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting techniques for dynamic PDCP timer adjustment).

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
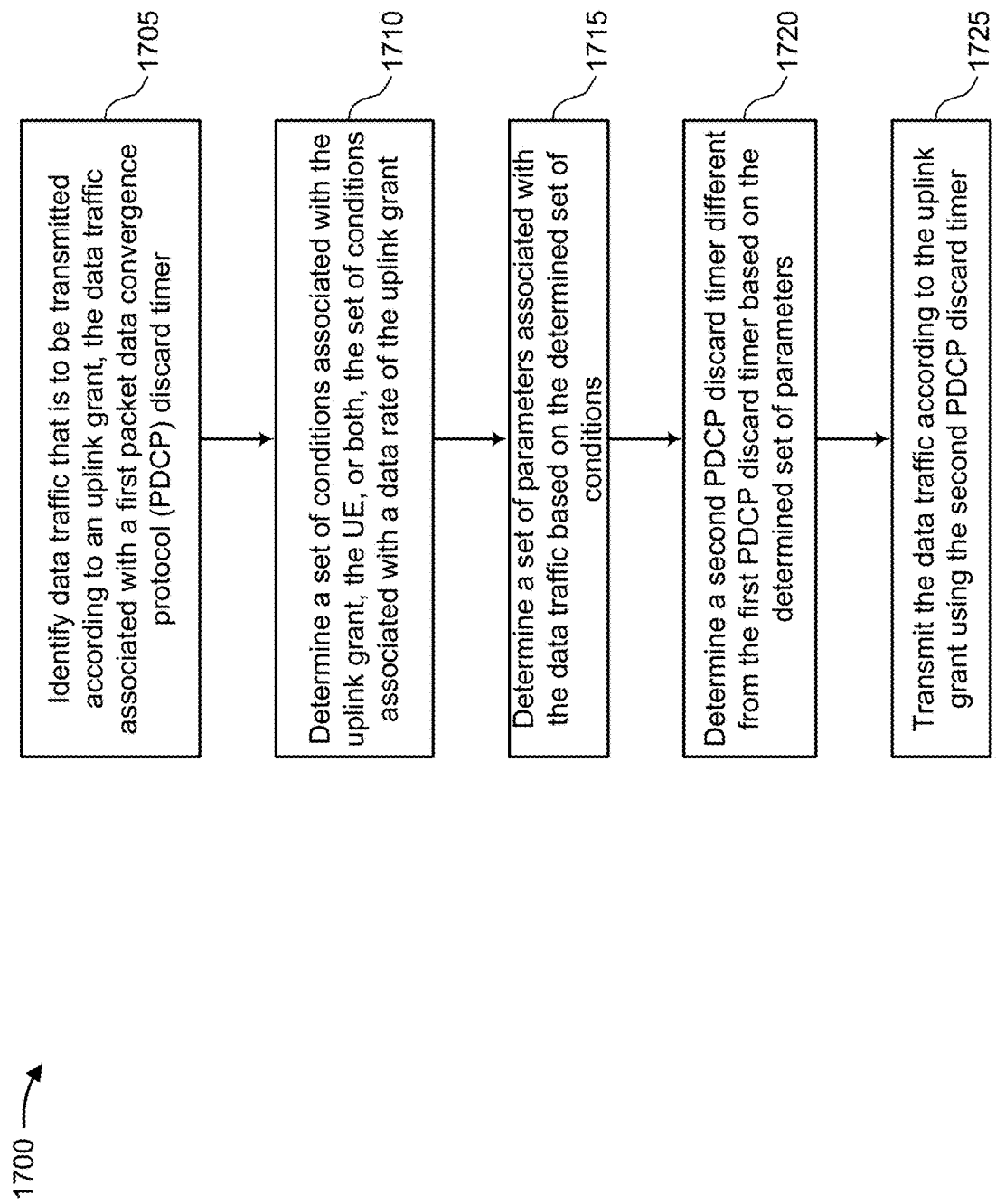
FIG. 17 shows a flowchart illustrating a method that supports techniques for dynamic PDCP timer adjustment in accordance with aspects of the present disclosure.

FIG. 17 shows a flowchart illustrating a method 1700 that supports techniques for dynamic PDCP timer adjustment in accordance with the present disclosure. The operations of method 1700 may be implemented by a UE 120 or its components as described herein. For example, the operations of method 1700 may be performed by a communications manager as described with reference to FIGS. 13 through 16. In some examples, a UE may execute a set of instructions to control the functional elements of the UE to perform the functions described below. Additionally, or alternatively, a UE may perform aspects of the functions described below using special-purpose hardware.

At 1705, the UE may identify data traffic that is to be transmitted according to an uplink grant, the data traffic associated with a first PDCP discard timer. The operations of 1705 may be performed according to the methods described herein. In some examples, aspects of the operations of 1705 may be performed by a data traffic manager as described with reference to FIGS. 13 through 16.

At 1710, the UE may determine a set of conditions associated with the uplink grant, the UE, or both, the set of conditions associated with a data rate of the uplink grant. The operations of 1710 may be performed according to the methods described herein. In some examples, aspects of the operations of 1710 may be performed by a data rate manager as described with reference to FIGS. 13 through 16.

At 1715, the UE may determine a set of parameters associated with the data traffic based on the determined set of conditions. The operations of 1715 may be performed according to the methods described herein. In some examples, aspects of the operations of 1715 may be performed by a data traffic manager as described with reference to FIGS. 13 through 16.

At 1720, the UE may determine a second PDCP discard timer different from the first PDCP discard timer based on the determined set of parameters. The operations of 1720 may be performed according to the methods described herein. In some examples, aspects of the operations of 1720 may be performed by a PDCP discard timer manager as described with reference to FIGS. 13 through 16.

At 1725, the UE may transmit the data traffic according to the uplink grant using the second PDCP discard timer. The operations of 1725 may be performed according to the methods described herein. In some examples, aspects of the operations of 1725 may be performed by a data traffic transmitting manager as described with reference to FIGS. 13 through 16.

Figure 18:
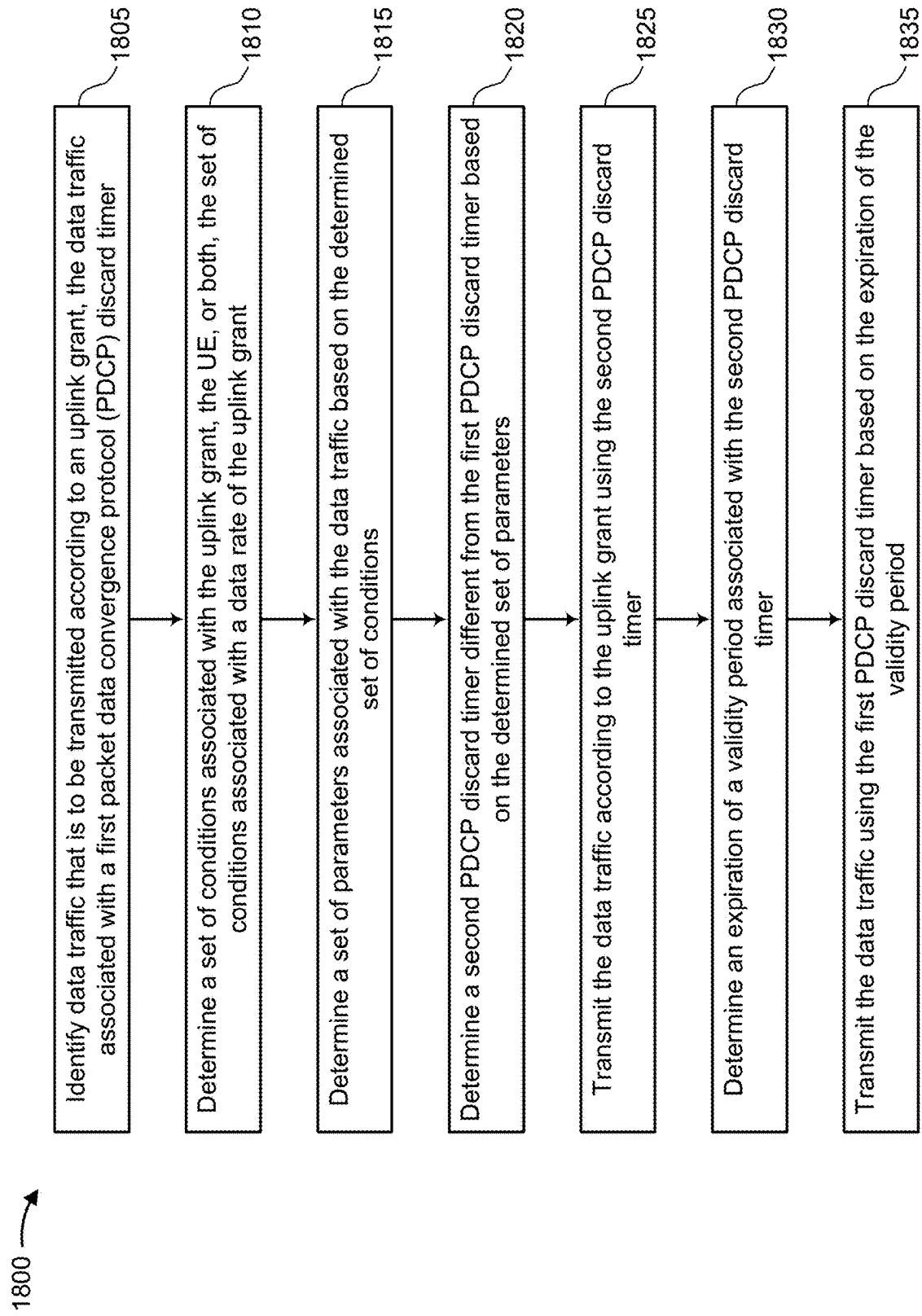
FIG. 18 shows a flowchart illustrating a method that supports techniques for dynamic PDCP timer adjustment, in accordance with the present disclosure.

FIG. 18 shows a flowchart illustrating a method 1800 that supports techniques for dynamic PDCP timer adjustment in accordance with the present disclosure. The operations of method 1800 may be implemented by a UE 120 or its components as described herein. For example, the operations of method 1800 may be performed by a communications manager as described with reference to FIGS. 13 through 16. In some examples, a UE may execute a set of instructions to control the functional elements of the UE to perform the functions described below. Additionally, or alternatively, a UE may perform aspects of the functions described below using special-purpose hardware.

At 1805, the UE may identify data traffic that is to be transmitted according to an uplink grant, the data traffic associated with a first PDCP discard timer. The operations of 1805 may be performed according to the methods described herein. In some examples, aspects of the operations of 1805 may be performed by a data traffic manager as described with reference to FIGS. 13 through 16.

At 1810, the UE may determine a set of conditions associated with the uplink grant, the UE, or both, the set of conditions associated with a data rate of the uplink grant. The operations of 1810 may be performed according to the methods described herein. In some examples, aspects of the operations of 1810 may be performed by a data rate manager as described with reference to FIGS. 13 through 16.

At 1815, the UE may determine a set of parameters associated with the data traffic based on the determined set of conditions. The operations of 1815 may be performed according to the methods described herein. In some examples, aspects of the operations of 1815 may be performed by a data traffic manager as described with reference to FIGS. 13 through 16.

At 1820, the UE may determine a second PDCP discard timer different from the first PDCP discard timer based on the determined set of parameters. The operations of 1820 may be performed according to the methods described herein. In some examples, aspects of the operations of 1820 may be performed by a PDCP discard timer manager as described with reference to FIGS. 13 through 16.

At 1825, the UE may transmit the data traffic according to the uplink grant using the second PDCP discard timer. The operations of 1825 may be performed according to the methods described herein. In some examples, aspects of the operations of 1825 may be performed by a data traffic transmitting manager as described with reference to FIGS. 13 through 16.

At 1830, the UE may determine an expiration of a validity period associated with the second PDCP discard timer. The operations of 1830 may be performed according to the methods described herein. In some examples, aspects of the operations of 1830 may be performed by a validity period manager as described with reference to FIGS. 13 through 16.

At 1835, the UE may transmit the data traffic using the first PDCP discard timer based on the expiration of the validity period. The operations of 1835 may be performed according to the methods described herein. In some examples, aspects of the operations of 1835 may be performed by a data traffic transmitting manager as described with reference to FIGS. 13 through 16.

Figure 19:
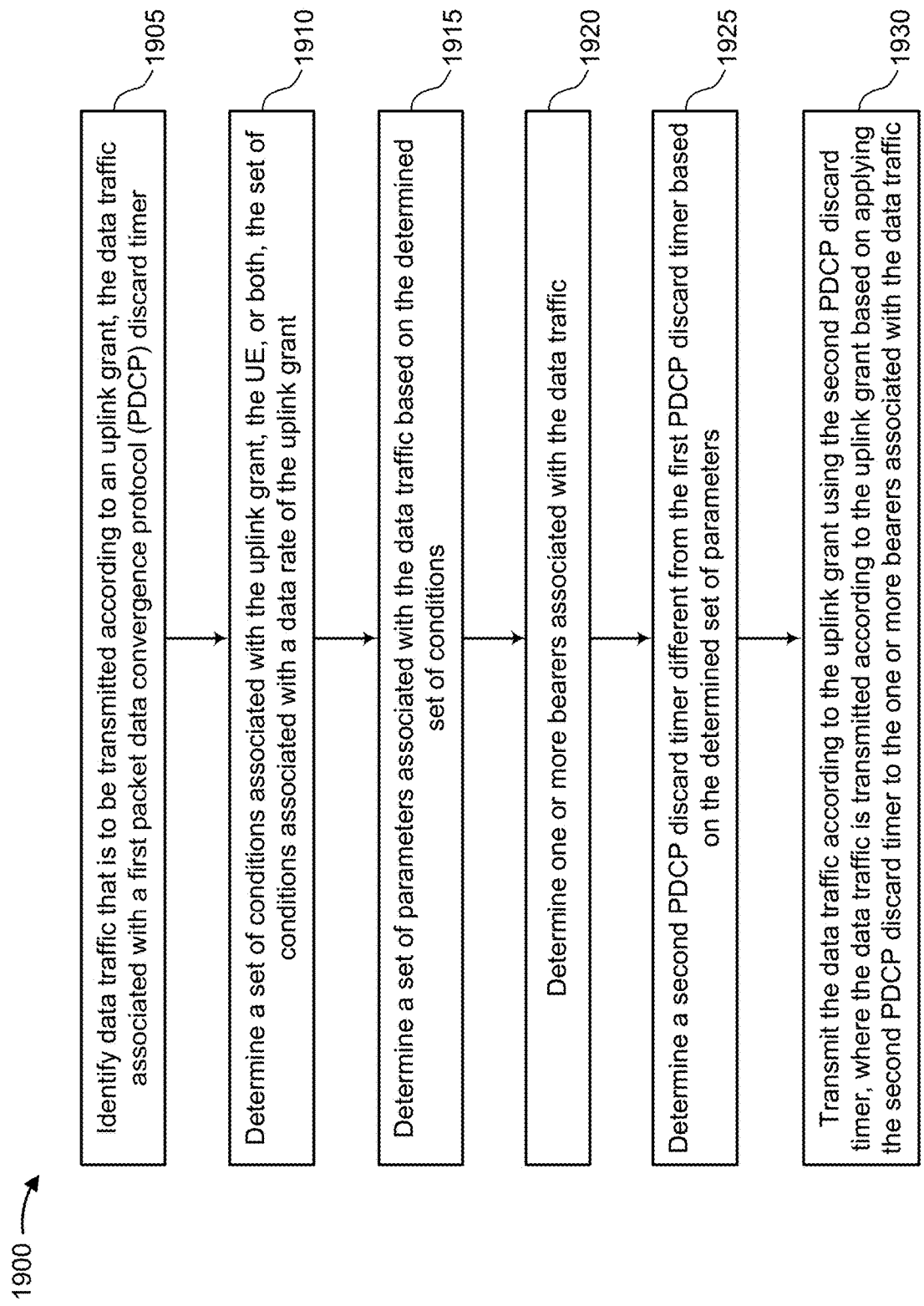
FIG. 19 shows a flowchart illustrating a method that supports techniques for dynamic PDCP timer adjustment, in accordance with the present disclosure.

FIG. 19 shows a flowchart illustrating a method 1900 that supports techniques for dynamic PDCP timer adjustment in accordance with the present disclosure. The operations of method 1900 may be implemented by a UE 120 or its components as described herein. For example, the operations of method 1900 may be performed by a communications manager as described with reference to FIGS. 13 through 16. In some examples, a UE may execute a set of instructions to control the functional elements of the UE to perform the functions described below. Additionally, or alternatively, a UE may perform aspects of the functions described below using special-purpose hardware.

At 1905, the UE may identify data traffic that is to be transmitted according to an uplink grant, the data traffic associated with a first PDCP discard timer. The operations of 1905 may be performed according to the methods described herein. In some examples, aspects of the operations of 1905 may be performed by a data traffic manager as described with reference to FIGS. 13 through 16.

At 1910, the UE may determine a set of conditions associated with the uplink grant, the UE, or both, the set of conditions associated with a data rate of the uplink grant. The operations of 1910 may be performed according to the methods described herein. In some examples, aspects of the operations of 1910 may be performed by a data rate manager as described with reference to FIGS. 13 through 16.

At 1915, the UE may determine a set of parameters associated with the data traffic based on the determined set of conditions. The operations of 1915 may be performed according to the methods described herein. In some examples, aspects of the operations of 1915 may be performed by a data traffic manager as described with reference to FIGS. 13 through 16.

At 1920, the UE may determine one or more bearers associated with the data traffic. The operations of 1920 may be performed according to the methods described herein. In some examples, aspects of the operations of 1920 may be performed by a bearer manager as described with reference to FIGS. 13 through 16.

At 1925, the UE may determine a second PDCP discard timer different from the first PDCP discard timer based on the determined set of parameters. The operations of 1925 may be performed according to the methods described herein. In some examples, aspects of the operations of 1925 may be performed by a PDCP discard timer manager as described with reference to FIGS. 13 through 16.

At 1930, the UE may transmit the data traffic according to the uplink grant using the second PDCP discard timer, where the data traffic is transmitted according to the uplink grant based on applying the second PDCP discard timer to the one or more bearers associated with the data traffic. The operations of 1930 may be performed according to the methods described herein. In some examples, aspects of the operations of 1930 may be performed by a data traffic transmitting manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following provides an overview of some Aspects of the present disclosure:

Aspect 1: A method of wireless communication performed by a user equipment (UE), comprising: receiving information indicating a timer value of a timer associated with discarding a packet data convergence protocol (PDCP) service data unit (SDU); determining that a timer modification condition is satisfied; modifying the timer value based at least in part on the determination that the timer modification condition is satisfied; and transmitting a communication using the modified timer value.

Aspect 2: The method of Aspect 1, wherein the timer modification condition is associated with an uplink grant limited scenario.

Aspect 3: The method of Aspect 2, wherein the uplink grant limited scenario is based at least in part on the UE modifying a buffer status report of the UE due to a thermal mitigation condition being satisfied.

Aspect 4: The method of Aspect 3, wherein the timer modification condition is based at least in part on the thermal mitigation condition, and wherein the timer modification condition indicates to increase the timer value based at least in part on the thermal mitigation condition being satisfied.

Aspect 5: The method of Aspect 4, wherein the timer is disabled based at least in part on the buffer status report being modified to indicate no data in a buffer of the UE.

Aspect 6: The method of Aspect 2, wherein the uplink grant limited scenario is based at least in part on a gap associated with a dual subscriber identity module dual standby configuration.

Aspect 7: The method of Aspect 6, wherein the timer is disabled based at least in part on a length of the gap being indeterminate at a time of initiation of the gap.

Aspect 8: The method of Aspect 6, wherein the timer modification condition is based at least in part on a length of the gap satisfying a threshold.

Aspect 9: The method of Aspect 8, wherein the timer value is increased by a value equal to the length of the gap.

Aspect 10: The method of Aspect 8, wherein the timer is disabled based at least in part on the length of the gap satisfying the threshold.

Aspect 11: The method of Aspect 2, wherein the uplink grant limited scenario is based at least in part on a block error rate (BLER) of the UE.

Aspect 12: The method of Aspect 11, wherein the timer value is modified based at least in part on the BLER satisfying a threshold.

Aspect 13: The method of Aspect 11, further comprising: determining the modified timer value based at least in part on a plurality of thresholds for the BLER.

Aspect 14: The method of Aspect 11, wherein the timer is disabled based at least in part on an uplink split bearer being configured for the UE, based at least in part on a primary radio link control entity of the uplink split bearer being associated with a BLER that satisfies a threshold, and based at least in part on a buffer size of the UE being less than a data split threshold of the uplink split bearer.

Aspect 15: The method of Aspect 1, wherein the timer modification condition is associated with a bearer configured for compression of packets transmitted on the bearer.

Aspect 16: The method of Aspect 15, wherein the timer value is modified based at least in part on the bearer being configured for compression of packets transmitted on the bearer.

Aspect 17: The method of Aspect 15, wherein the bearer is configured for at least one of robust header compression or uplink data compression.

Aspect 18: The method of any of Aspects 1-17, wherein the timer value is modified based at least in part on a bearer of the UE being configured with integrity protection.

Aspect 19: The method of any of Aspects 1-18, further comprising: determining an expiration of a validity period associated with the modified timer value; and transmitting the communication using the timer value prior to modification based at least in part on the expiration of the validity period.

Aspect 20: The method of any of Aspects 1-19, further comprising: determining a type of bearer associated with the communication, a quality of service metric associated with the communication, a priority associated with the communication, a delay sensitivity metric associated with the communication, a reliability metric associated with the communication, or any combination thereof, wherein modifying the timer value is based at least in part on the type of bearer, the quality of service metric, the delay sensitivity metric, the reliability metric, or any combination thereof.

Aspect 21: The method of any of Aspects 1-20, further comprising: determining that a quantity of data traffic that is to be transmitted in the communication is greater than or equal to a data traffic threshold, wherein the timer modification condition is based at least in part on the quantity of the data traffic being greater than or equal to the data traffic threshold.

Aspect 22: The method of any of Aspects 1-21, further comprising: determining that a power level for transmitting uplink transmissions is less than or equal to a threshold power level, wherein the timer modification condition is based at least in part on the power level being less than or equal to the threshold power level.

Aspect 23: The method of any of Aspects 1-22, wherein transmitting the communication using the modified timer value comprises: refraining from transmitting data units of the communication based at least in part on the modified timer value.

Aspect 24: The method of Aspect 23, wherein refraining from transmitting the data units of the communication based at least in part on the modified timer value comprises: determining reception times at which each of the data units of the communication are received at a buffer of the UE; determining buffer durations associated with each of the data units of the communication based at least in part on the reception times; and discarding data units which include buffer durations which are greater than or equal to a duration associated with the modified timer value.

Aspect 25: An apparatus for wireless communication at a device, comprising a processor; memory coupled with the processor; and instructions stored in the memory and executable by the processor to cause the apparatus to perform the method of one or more Aspects of Aspects 1-24.

Aspect 26: A device for wireless communication, comprising a memory and one or more processors coupled to the memory, the memory and the one or more processors configured to perform the method of one or more Aspects of Aspects 1-24.

Aspect 27: An apparatus for wireless communication, comprising at least one means for performing the method of one or more Aspects of Aspects 1-24.

Aspect 28: A non-transitory computer-readable medium storing code for wireless communication, the code comprising instructions executable by a processor to perform the method of one or more Aspects of Aspects 1-24.

Aspect 29: A non-transitory computer-readable medium storing a set of instructions for wireless communication, the set of instructions comprising one or more instructions that, when executed by one or more processors of a device, cause the device to perform the method of one or more Aspects of Aspects 1-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving information indicating a timer value of a timer associated with discarding a packet data convergence protocol (PDCP) service data unit (SDU);
determining that a timer modification condition is satisfied,
wherein the timer modification condition is associated with an uplink grant limited scenario, and
wherein the uplink grant limited scenario is based at least in part on a gap associated with a dual subscriber identity module dual standby configuration;
modifying the timer value based at least in part on the determination that the timer modification condition is satisfied; and
transmitting a communication using the modified timer value.

2. The method of claim 1, wherein the timer is disabled based at least in part on a length of the gap being indeterminate at a time of initiation of the gap.

3. The method of claim 1, wherein the timer modification condition is based at least in part on a length of the gap satisfying a threshold.

4. The method of claim 3, wherein the timer value is increased by a value equal to the length of the gap.

5. The method of claim 3, wherein the timer is disabled based at least in part on the length of the gap satisfying the threshold.

6. The method of claim 1, wherein the timer modification condition is associated with a bearer configured for compression of packets transmitted on the bearer.

7. The method of claim 6, wherein the timer value is modified based at least in part on the bearer being configured for compression of packets transmitted on the bearer.

8. The method of claim 6, wherein the bearer is configured for at least one of robust header compression or uplink data compression.

9. The method of claim 1, wherein the timer value is modified based at least in part on a bearer of the UE being configured with integrity protection.

10. The method of claim 1, further comprising:
determining an expiration of a validity period associated with the modified timer value; and
transmitting the communication using the timer value prior to modification based at least in part on the expiration of the validity period.

11. The method of claim 1, further comprising:
determining a type of bearer associated with the communication, a quality of service metric associated with the communication, a priority associated with the communication, a delay sensitivity metric associated with the communication, a reliability metric associated with the communication, or any combination thereof, wherein modifying the timer value is based at least in part on the type of bearer, the quality of service metric, the delay sensitivity metric, the reliability metric, or any combination thereof.

12. The method of claim 1, further comprising:
determining that a quantity of data traffic that is to be transmitted in the communication is greater than or equal to a data traffic threshold, wherein the timer modification condition is based at least in part on the quantity of the data traffic being greater than or equal to the data traffic threshold.

13. The method of claim 1, further comprising:
determining that a power level for transmitting uplink transmissions is less than or equal to a threshold power level, wherein the timer modification condition is based at least in part on the power level being less than or equal to the threshold power level.

14. The method of claim 1, wherein transmitting the communication using the modified timer value comprises:
refraining from transmitting data units of the communication based at least in part on the modified timer value.

15. The method of claim 14, wherein refraining from transmitting the data units of the communication based at least in part on the modified timer value comprises:
determining reception times at which each of the data units of the communication are received at a buffer of the UE;
determining buffer durations associated with each of the data units of the communication based at least in part on the reception times; and
discarding data units which include buffer durations which are greater than or equal to a duration associated with the modified timer value.

16. A method of wireless communication performed by a user equipment (UE), comprising:
receiving information indicating a timer value of a timer associated with discarding a packet data convergence protocol (PDCP) service data unit (SDU);
determining that a timer modification condition is satisfied,
wherein the timer modification condition is associated with an uplink grant limited scenario, and
wherein the uplink grant limited scenario is based at least in part on the UE modifying a buffer status report of the UE due to a thermal mitigation condition being satisfied;
modifying the timer value based at least in part on the determination that the timer modification condition is satisfied; and
transmitting a communication using the modified timer value.

17. The method of claim 16, wherein the timer modification condition is based at least in part on the thermal mitigation condition, and wherein the timer modification condition indicates to increase the timer value based at least in part on the thermal mitigation condition being satisfied.

18. The method of claim 17, wherein the timer is disabled based at least in part on the buffer status report being modified to indicate no data in a buffer of the UE.

19. A method of wireless communication performed by a user equipment (UE), comprising:
receiving information indicating a timer value of a timer associated with discarding a packet data convergence protocol (PDCP) service data unit (SDU), wherein the timer is disabled based at least in part on at least one of an uplink split bearer being configured for the UE, a primary radio link control entity of the uplink split bearer being associated with a BLER that satisfies a threshold, or a buffer size of the UE being less than a data split threshold of the uplink split bearer;
determining that a timer modification condition is satisfied,
wherein the timer modification condition is associated with an uplink grant limited scenario, and
wherein the uplink grant limited scenario is based at least in part on a block error rate (BLER) of the UE;
modifying the timer value based at least in part on the determination that the timer modification condition is satisfied; and
transmitting a communication using the modified timer value.

20. The method of claim 19, wherein the timer value is modified based at least in part on the BLER satisfying a threshold.

21. The method of claim 19, further comprising:
determining the modified timer value based at least in part on a plurality of thresholds for the BLER.

22. A user equipment (UE) for wireless communication, comprising:
a memory; and
one or more processors coupled to the memory, the one or more processors configured to:
receive information indicating a timer value of a timer associated with discarding a packet data convergence protocol (PDCP) service data unit (SDU);
determine that a timer modification condition is satisfied,
wherein the timer modification condition is associated with an uplink grant limited scenario, and
wherein the uplink grant limited scenario is based at least in part on a gap associated with a dual subscriber identity module dual standby configuration;
modify the timer value based at least in part on the determination that the timer modification condition is satisfied; and
transmit a communication using the modified timer value.

23. The UE of claim 22, wherein the timer modification condition is associated with a bearer configured for compression of packets transmitted on the bearer.

24. A user equipment (UE) for wireless communication, comprising:
a memory; and
one or more processors coupled to the memory, the one or more processors configured to:
receive information indicating a timer value of a timer associated with discarding a packet data convergence protocol (PDCP) service data unit (SDU);
determine that a timer modification condition is satisfied,
wherein the timer modification condition is associated with an uplink grant limited scenario, and
wherein the uplink grant limited scenario is based at least in part on the UE modifying a buffer status report of the UE due to a thermal mitigation condition being satisfied;
modify the timer value based at least in part on the determination that the timer modification condition is satisfied; and
transmit a communication using the modified timer value.

25. The UE of claim 24, wherein the timer modification condition is based at least in part on the thermal mitigation condition, and wherein the timer modification condition indicates to increase the timer value based at least in part on the thermal mitigation condition being satisfied.

26. A non-transitory computer-readable medium storing a set of instructions for wireless communication, the set of instructions comprising:
one or more instructions that, when executed by one or more processors of a user equipment (UE), cause the UE to:
receive information indicating a timer value of a timer associated with discarding a packet data convergence protocol (PDCP) service data unit (SDU);
determine that a timer modification condition is satisfied,
wherein the timer modification condition is associated with an uplink grant limited scenario, and
wherein the uplink grant limited scenario is based at least in part on a gap associated with a dual subscriber identity module dual standby configuration;
modify the timer value based at least in part on the determination that the timer modification condition is satisfied; and
transmit a communication using the modified timer value.

27. An apparatus for wireless communication, comprising:
means for receiving information indicating a timer value of a timer associated with discarding a packet data convergence protocol (PDCP) service data unit (SDU);
means for determining that a timer modification condition is satisfied,
wherein the timer modification condition is associated with an uplink grant limited scenario, and
wherein the uplink grant limited scenario is based at least in part on a gap associated with a dual subscriber identity module dual standby configuration;
means for modifying the timer value based at least in part on the determination that the timer modification condition is satisfied; and
means for transmitting a communication using the modified timer value.

28. A user equipment (UE) for wireless communication, comprising:
a memory; and
one or more processors coupled to the memory, the one or more processors configured to:
receive information indicating a timer value of a timer associated with discarding a packet data convergence protocol (PDCP) service data unit (SDU), wherein the timer is disabled based at least in part on at least one of an uplink split bearer being configured for the UE, a primary radio link control entity of the uplink split bearer being associated with a BLER that satisfies a threshold, or a buffer size of the UE being less than a data split threshold of the uplink split bearer;
determine that a timer modification condition is satisfied,
wherein the timer modification condition is associated with an uplink grant limited scenario, and
wherein the uplink grant limited scenario is based at least in part on a block error rate (BLER) of the UE;

modify the timer value based at least in part on the determination that the timer modification condition is satisfied; and transmit a communication using the modified timer value.

\* \* \* \* \*